(12) United States Patent
Afrasiabi et al.

(10) Patent No.: US 12,014,574 B2
(45) Date of Patent: Jun. 18, 2024

(54) HUMAN GESTURE RECOGNITION FOR AUTONOMOUS AIRCRAFT OPERATION

(71) Applicant: The Boeing Company, Chicago, IL (US)

(72) Inventors: Amir Afrasiabi, University Place, WA (US); Kwang Hee Lee, Seoul (KR); Bhargavi Patel, Huntsville, AL (US); Young Suk Cho, Seoul (KR); Junghyun Oh, Seongnam-Si (KR)

(73) Assignee: The Boeing Company, Chicago, IL (US)

( * ) Notice: Subject to any disclaimer, the term of this patent is extended or adjusted under 35 U.S.C. 154(b) by 355 days.

(21) Appl. No.: 17/452,206

(22) Filed: Oct. 25, 2021

(65) Prior Publication Data

US 2022/0129667 A1 Apr. 28, 2022

Related U.S. Application Data

(60) Provisional application No. 63/105,774, filed on Oct. 26, 2020.

(51) Int. Cl.
*G06V 40/20* (2022.01)
*B64D 47/08* (2006.01)
*G06V 10/46* (2022.01)
*G06V 10/75* (2022.01)

(52) U.S. Cl.
CPC .............. *G06V 40/23* (2022.01); *B64D 47/08* (2013.01); *G06V 10/462* (2022.01); *G06V 10/751* (2022.01)

(58) Field of Classification Search
CPC ...... G06V 40/23; G06V 40/28; G06V 10/462; G06V 10/751; G06V 10/34; G06V 10/56; G06V 10/62; G06V 10/80; B64D 47/08; B64U 2201/20
See application file for complete search history.

(56) References Cited

U.S. PATENT DOCUMENTS

| 7,983,450 B2 | 7/2011 | Higgins | |
|---|---|---|---|
| 2018/0293454 A1* | 10/2018 | Xu | G06V 20/49 |
| 2019/0080470 A1* | 3/2019 | Zhu | G06T 7/74 |

(Continued)

FOREIGN PATENT DOCUMENTS

EP 0743245 B1 3/2000

OTHER PUBLICATIONS

Carreira, Joao, and Andrew Zisserman. "Quo vadis, action recognition? a new model and the kinetics dataset." In proceedings of the IEEE Conference on Computer Vision and Pattern Recognition, pp. 6299-6308. 2017. (Year: 2017).*

(Continued)

*Primary Examiner* — Carol Wang
(74) *Attorney, Agent, or Firm* — Yee & Associates, P.C.

(57) ABSTRACT

A method, apparatus, system, and computer program product for training a gesture recognition machine learning model system. Temporal images for a set of gestures used for ground operations for an aircraft are identified by a computer system. Pixel variation data identifying movement on a per image basis from the temporal images is generated by the computer system. The temporal images and the pixel variation data form training data. A set of feature machine learning models is trained by the computer system to recognize features using the training data.

40 Claims, 15 Drawing Sheets

(56) References Cited

U.S. PATENT DOCUMENTS

| | | | | |
|---|---|---|---|---|
| 2020/0167554 | A1* | 5/2020 | Wang | G06F 3/017 |
| 2022/0019780 | A1* | 1/2022 | Ozserin | G06F 3/017 |
| 2022/0398868 | A1* | 12/2022 | Hosono | G06V 20/46 |

OTHER PUBLICATIONS

Kassab, Mohamed A., Mostafa Ahmed, Ali Maher, and Baochang Zhang. "Real-time human-UAV interaction: New dataset and two novel gesture-based interacting systems." IEEE Access 8 (2020): 195030-195045. (Year: 2020).*

Song, Yale, David Demirdjian, and Randall Davis. "Tracking body and hands for gesture recognition: Natops aircraft handling signals database." In 2011 IEEE International Conference on Automatic Face & Gesture Recognition (FG), pp. 500-506. IEEE, 2011. (Year: 2011).*

* cited by examiner

HUMAN GESTURE RECOGNITION FOR AUTONOMOUS AIRCRAFT OPERATION

RELATED PROVISIONAL APPLICATION

This application is related to and claims the benefit of priority of provisional U.S. Patent Application Ser. No. 63/105,774, entitled "Human Gesture Recognition for Autonomous Aircraft Operation", filed on Oct. 26, 2021, which is hereby incorporated by reference.

BACKGROUND INFORMATION

1. Field

The present disclosure relates generally to aircraft and, in particular, to an improved method, apparatus, system, and computer program product for human gesture recognition for controlling ground operations for autonomous aircraft.

2. Background

In aircraft operations, marshaling is a one-on-one visual communication between ground personnel and pilots of an aircraft. Marshaling is part of aircraft ground handling that is formed as an alternative or in addition to radio communications between an aircraft and air-traffic control.

A marshaller is a human operator that may signal a pilot of an aircraft to perform operations such as turning, slow down, shut down engines, or other operations that an aircraft may be directed to perform while on the ground. The hand signals may be enhanced through the use of gloves, wands, such as handheld illuminated beacons, or both gloves and wands.

With an autonomous unmanned aerial vehicle (UAV), the hand signals are not feasible because a pilot in the form of a human operator with knowledge of the hand signals is absent in this type of aircraft. The autonomous unmanned aerial vehicle is controlled by a aircraft system such as an autopilot, which is not designed to communicate with a marshaller.

Therefore, it would be desirable to have a method and apparatus that take into account at least some of the issues discussed above, as well as other possible issues. For example, it would be desirable to have a method and apparatus that overcome a technical problem with managing ground operations with visual signaling for autonomous unmanned aerial vehicles.

SUMMARY

An embodiment of the present disclosure provides a gesture recognition system. The gesture recognition system comprises a computer system and a machine learning model manager in the computer system. The machine learning model manager is configured to identify temporal color images for a set of gestures used for ground operations for an aircraft. The machine learning model manager is configured to generate optical flow data identifying a distribution of visual velocities of a movement of a set of brightness patterns in the temporal color images on a per image basis from the temporal color images. The machine learning model manager is configured to generate saliency maps identifying movement in the temporal color images using image segmentation in which a saliency map in the saliency maps is generated on the per image basis. The temporal color images, the optical flow data, and the saliency maps form training data. The machine learning model manager is configured to train a set of feature machine learning models to recognize features using the training data. The machine learning model manager is configured to train a set of classifier machine learning models to recognize gestures using the features identified by the set of feature machine learning models trained using the training data. The set of feature machine learning models and the set of classifier machine learning models form a gesture recognition machine learning model system.

Another embodiment of the present disclosure provides a gesture recognition system comprising a computer system and a machine learning model manager in the computer system. The machine learning model manager is configured to identify temporal images for a set of gestures used for ground operations of an aircraft. The machine learning model manager is configured to generate pixel variation data identifying movement in the temporal images on a per image basis. The temporal images and the pixel variation data form training data. The machine learning model manager is configured to train a set of feature machine learning models to recognize features using the training data.

Yet another embodiment of the present disclosure provides a method for training a gesture recognition machine learning model system. Temporal images for a set of gestures used for ground operations for an aircraft are identified by a computer system. Pixel variation data identifying movement on a per image basis from the temporal images is generated by the computer system. The temporal images and the pixel variation data form training data. A set of feature machine learning models is trained by the computer system to recognize features using the training data.

Still another embodiment of the present disclosure provides a computer program product for a gesture recognition machine learning model system. The computer program product comprises a computer-readable storage media with first program code, second program code, and third program code stored on the computer-readable storage media. The first program code is executable by a computer system to cause the computer system to identify temporal images for a set of gestures used for ground operations for an aircraft. The second program code is executable by the computer system to cause the computer system to generate pixel variation data identifying movement on a per image basis from the temporal images, wherein the temporal images and the pixel variation data form training data. The third program code is executable by the computer system to cause the computer system to train a set of feature machine learning models to recognize features using the training data.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
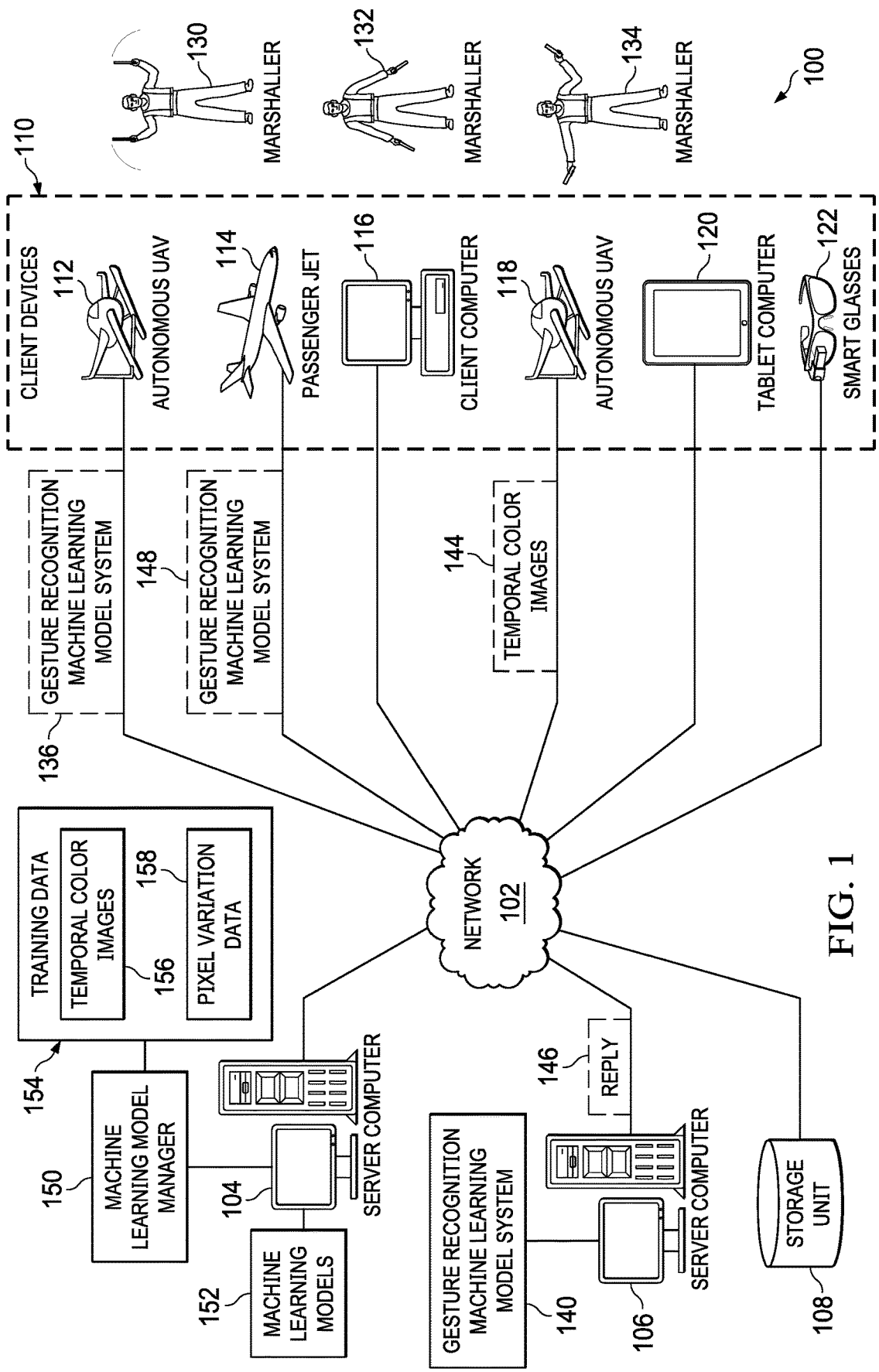
FIG. 1 is a pictorial representation of a network of data processing systems in which illustrative embodiments may be implemented.

The illustrative embodiments recognize and take into account one or more different considerations. For example, the illustrative embodiments recognize and take into account that it would be desirable to have a system for recognizing hand signals generated by human operators, such as marshallers, to perform ground operations. The illustrative embodiments recognize and take into account that recognition of the hand signals should be performed without modifications of ground rule operations or guidelines.

The illustrative embodiments also recognize and take into account that machine learning models can be trained to recognize gestures such as hand signals made by a marshaller. The illustrative embodiments also recognize and take into account that challenges are present with using the machine learning models. For example, the illustrative embodiments recognize and take into account that real-time recognition of hand signals is important in performing ground operations for an aircraft. The illustrative embodiments recognize and take into account that in performing this type of real-time recognition, speed and accuracy are important in recognizing the hand signals to perform ground operations for an aircraft.

The illustrative embodiments recognize and take into account that delays or errors in interpreting gestures can result in undesired consequences such as unintended impacts, runway incursions, or other undesired situations.

The illustrative embodiments also recognize and take into account that identifying a marshaller can also be more difficult than desired in addition to recognizing gestures. For example, the illustrative embodiments recognize and take into account that a challenge for pilots includes locating a marshaller especially in smaller aircrafts and smaller airports. Further, the challenge is present in locating a marshaller when visibility is limited either due to environmental conditions or lighting conditions. The environmental conditions can include fog, rain, snow, multiple human operators on the ground, and other conditions that may make identifying a marshaller more difficult than desired.

Thus, the illustrative embodiments provide a method, apparatus, system, and computer program product for recognizing hand signals to perform ground operations for aircraft. One illustrative example provides a method for training a gesture recognition machine learning model system. Temporal images for a set of gestures used for ground operations for an aircraft are identified by a computer system. Pixel variation data identifying movement on a per image basis from the temporal images is generated by the computer system. The temporal images and the pixel variation data form training data. A set of feature machine learning models is trained by the computer system to recognize features using the training data.

As used herein, a "set of," when used with reference to items means one or more items. For example, a "set of feature machine learning models" is one or more feature machine learning models.

The use of temporal images and pixel variation data in training data can improve at least one of accuracy or speed at which gestures can be recognized by a machine learning model as compared to currently used machine learning models. As a result, a gesture recognition system using machine learning models trained using training data such as temporal images and pixel variation data can enable the use of the gesture recognition system in an aircraft to recognize gestures made by a marshaller to perform ground operations for the aircraft.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include autonomous unmanned aerial vehicle (UAV) 112, passenger jet 114, client computer 116, and autonomous unmanned aerial vehicle (UAV) 118. Client devices 110 can be, for example, computers, workstations, network computers, vehicles, aircraft, autonomous unmanned aerial vehicles (UAVs), or other client devices. In the depicted example, server computer 104 provides information, such as boot files, operating system images, and applications to client devices 110. Further, client devices 110 can also include other types of client devices such as tablet computer 120 and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections. For example, autonomous unmanned aerial vehicle (UAV) 112, passenger jet 114, and autonomous unmanned aerial vehicle (UAV) 118 can connect to network 102 using wireless connections when operating on the ground or in the air.

Program code located in network data processing system 100 can be stored on a computer-recordable storage media and downloaded to a data processing system or other device for use. For example, program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, ground operations may be performed by at least one of autonomous unmanned aerial vehicle (UAV) 112, passenger jet 114, or autonomous unmanned aerial vehicle (UAV) 118. These ground operations can include, for example, a pushback from a gate, taxiing to a runway, turning, and other suitable operations on the ground.

In this illustrative example, these aircraft can receive communications for performing ground operations for marshallers. A marshaller is a human operator that uses gestures such as hand signals to provide instructions and information to an aircraft on the ground.

In this example, marshaller 130 communicates with autonomous unmanned aerial vehicle (UAV) 112, marshaller 132 communicates with passenger jet 114, and marshaller 134 communicates with autonomous unmanned aerial vehicle (UAV) 118. These communications are performed using gestures.

In this illustrative example, autonomous unmanned aerial vehicle (UAV) 112 is a pilotless aircraft and as such does not have a pilot to interpret gestures made by marshaller 130. As depicted, autonomous unmanned aerial vehicle (UAV) 112 can have gesture recognition machine learning model system 136, which is configured to recognize gestures made by marshaller 130 using images from a camera system in autonomous unmanned aerial vehicle (UAV) 112.

In another illustrative example, autonomous unmanned aerial vehicle (UAV) 118 may also recognize gestures made by marshaller 134 using gesture recognition machine learning model system 140 located in server computer 106. In this illustrative example, autonomous unmanned aerial vehicle (UAV) 118 can send temporal color images 144 generated by a camera system in autonomous unmanned aerial vehicle (UAV) 118 to gesture recognition machine learning model system 140 over network 102. Temporal color images 144 are a series of images that capture one or more gestures made by marshaller 134.

In this illustrative example, gesture recognition machine learning model system 140 processes temporal color images 144 to recognize gestures made by marshaller 134. In this example, gesture recognition machine learning model system 140 returns reply 146 to autonomous unmanned aerial vehicle (UAV) 118 over network 102. In this illustrative example, reply 146 can include at least one of identification gestures or commands in which this information is in a form usable by a data processing system such as an autonomous flight management system in autonomous unmanned aerial vehicle (UAV) 118.

As another illustrative example, gestures can also be recognized for aircraft that are piloted by human operators. For example, passenger jet 114 may have one pilot or two pilots. In this illustrative example, gesture recognition machine learning model system 148 can recognize gestures made by marshaller 132. In this example, these gestures may be communicated to pilots or to an autopilot or some other system that can autonomously perform ground operations for passenger jet 114. Although a pilot is present in passenger jet 114, the use of gesture recognition machine learning model system 148 can be used to reduce the workload on the pilot or crewmembers in passenger jet 114.

Further, when a pilot is present in an aircraft, such as in passenger jet 114, gesture recognition machine learning model system 148 can locate marshaller 132. The identification of marshaller 132 can be indicated to the pilot of passenger jet 114 using a graphical indicator in a heads-up display or some other display system to provide an augmented reality display to the pilot. For example, a graphical indicator can highlight marshaller 132 by displaying a box around a live view of marshaller 132.

In this illustrative example, these gesture recognition machine learning model systems can be trained by machine learning model manager 150 to recognize the gestures made by marshallers.

For example, machine learning model manager 150 can train machine learning models 152 used in gesture recognition machine learning model system 136, gesture recognition machine learning model system 140, and gesture recognition machine learning model system 148. As depicted, the training is performed using training data 154. In this illustrative example, training data 154 comprises temporal color images 156 and pixel variation data 158.

Figure 2:
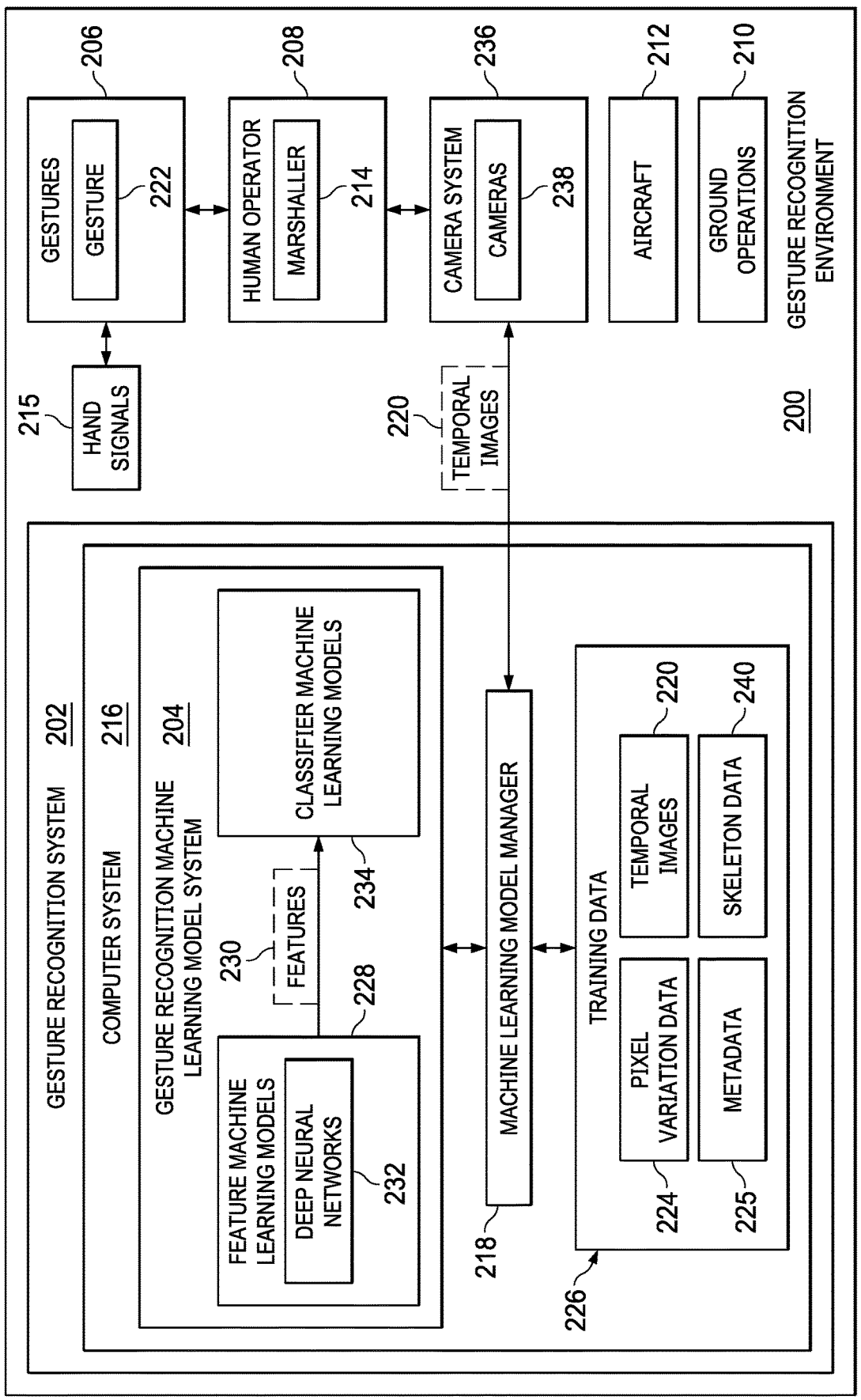
FIG. 2 is a block diagram of a gesture recognition environment in accordance with an illustrative embodiment.

With reference now to FIG. 2, a block diagram of a gesture recognition environment is depicted in accordance with an illustrative embodiment. In this illustrative example, gesture recognition environment 200 includes components that can be implemented in hardware such as the hardware shown in network data processing system 100 in FIG. 1.

In this illustrative example, gesture recognition system 202 in gesture recognition environment 200 operates gesture recognition machine learning model system 204 to recognize gestures 206 made by human operator 208 for use in ground operations 210 for aircraft 212. In this illustrative example, aircraft 212 can be selected from one of an autonomous aerial vehicle, a remote controlled unmanned aerial vehicle, a manned aircraft, a rotorcraft, a passenger air vehicle, and other suitable types of aircraft.

Human operator 208 can also be referred to as marshaller 214 when making gestures 206 for ground operations 210 for aircraft 212. In this illustrative example, gestures 206 can take the form of hand signals 215. Further, gestures 206 may also include a pose or movement of other parts of human operator 208 in making gestures 206 for ground operations 210 for aircraft 212.

In this illustrative example, gesture recognition system 202 includes a number of different components. As depicted, gesture recognition system 202 comprises computer system 216 and machine learning model manager 218. Machine learning model manager 218 is located in computer system 216.

Machine learning model manager 218 can be implemented in software, hardware, firmware, or a combination thereof. When software is used, the operations performed by machine learning model manager 218 can be implemented in program code configured to run on hardware, such as a processor unit. When firmware is used, the operations performed by machine learning model manager 218 can be implemented in program code and data and stored in persistent memory to run on a processor unit. When hardware is employed, the hardware can include circuits that operate to perform the operations in machine learning model manager 218.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 216 is a physical hardware system and includes one or more data processing systems. When more than one data processing system is present in computer system 216, those data processing systems are in communication with each other using a communications medium. The communications medium can be a network. The data processing systems can be selected from at least one of a computer, a server computer, a tablet computer, or some other suitable data processing system.

In this illustrative example, machine learning model manager 218 can identify temporal images 220 for a set of gestures 206 used for ground operations 210 of aircraft 212. As depicted, temporal images 220 can be generated by camera system 236. As depicted, camera system 236 comprises a set of cameras 238.

In another illustrative example, temporal images 220 can also include modified or generated images. For example, images received from camera system 236 or from other sources can be modified to provide realistic images of rare situations such as a low light situation in which rain occurs at night. These types of modifications can be performed using techniques such as a Generative Adversarial Network Style Transfer process to synthesize realistic images of different situations.

In this illustrative example, temporal images 220 are images in a sequential order based on the time when those images were generated. In this illustrative example, temporal images 220 are generated over a time period during which marshaller 214 makes gestures 206. Temporal images 220 can be divided into sets of temporal images in which each set of temporal images 220 is for the movement of marshaller 214 making gesture 222 in gestures 206. Metadata 225, such as labels or tags, can be associated with temporal images 220 to identify which of gestures 206 are contained in particular images in temporal images 220. Metadata 225 can also include other information such as a height and width of images, a number of pixels in an image, a number of channels, weather conditions, or other suitable information.

Additionally, machine learning model manager 218 can generate pixel variation data 224 identifying movement in temporal images 220 on a per image basis. Metadata 225 can also be used to associate pixel variation data 224 with at least one of temporal images 220 from which pixel variation data 224 was generated for gestures 206.

In this illustrative example, temporal images 220 and pixel variation data 224 form training data 226. In this illustrative example, training data 226 also can include metadata 225.

In yet another illustrative example, training data 226 can also include skeleton data 240. Skeleton data 240 can be data describing at least one of joints or rigid parts in a human operator in an image. Skeleton data 240 can be generated using articulated pose estimation. This type of estimation can be performed using currently available techniques such as those in OpenPose. OpenPose is real-time, multi-person system that jointly detects human body, hand, facial, and foot key-points in images. Metadata 225 can also be used to associate particular images in skeleton data 240 with temporal images 220 from which images and skeleton data 240 were generated for with gestures 206. Additionally, metadata 225 can include labels such as labels identifying which pixels represent marshaller 214 in temporal images 220.

As depicted, machine learning model manager 218 can train a set of feature machine learning models 228 to recognize features 230 using training data 226. In this illustrative example, the training of a machine learning model is performed using machine learning which involves inputting data into the process and allowing the process to adjust and improve the function of the set of machine learning models.

A machine learning model is a type of artificial intelligence model that can learn without being explicitly programmed. A machine learning model can learn based on training data input into the machine learning model. The machine learning model can learn using various types of machine learning algorithms. The machine learning algorithms include at least one of a supervised learning, an unsupervised learning, a feature learning, a sparse dictionary learning, an anomaly detection, association rules, or other types of learning algorithms. Examples of machine learning models include a deep neural network, a convolutional neural network, an artificial neural network, a decision tree, a support vector machine, a Bayesian network, a genetic algorithm, and other types of models. These machine learning models can be trained using data and process additional data to provide a desired output.

In this illustrative example, the set of feature machine learning models 228 can be, for example, a set of deep neural networks 232. A deep neural network (DNN) is an artificial neural network (ANN) with multiple layers between the input and output layers. A deep neural network can model complex non-linear relationships. The neural network architectures can generate compositional models where the object is expressed as a layered composition of primitives. The extra layers enable composition of features from lower layers. The training of the set of deep neural networks 232 can be performed using supervised machine learning algorithms.

In this illustrative example, a convolutional neural network is an example of a classic deep neural network that can be used to analyze images. A convolutional neural network is comprised of multilayer perceptrons. A multilayer perceptron is a class of feed forward artificial neural networks. A perceptron is an algorithm supervised learning of binary classifiers.

In this illustrative example, features 230 are features in temporal images 220. Further, in training the set of feature machine learning models 228, features 230 can also be recognized when not found in temporal images 220.

Further, machine learning model manager 218 can train a set of classifier machine learning models 234 to recognize gestures 206 using features 230 identified by the set of feature machine learning models 228. In this illustrative example, the set of feature machine learning models 228 and the set of classifier machine learning models 234 form gesture recognition machine learning model system 204. After training, gesture recognition system 202 can be used to recognize gestures 206 made by marshaller 214 for ground operations 210 for aircraft 212. Identifying marshaller 214 in temporal images 220 can be performed as part of the process of recognizing gestures 206. Gesture recognition machine learning model system 204 can identify marshaller 214 as an object of interest and can then identify gestures 206 made by marshaller 214. In another example, gestures 206 can be identified as temporal images 220 and then marshaller 214 can be identified as the object of interest making gestures 206.

Figure 3:
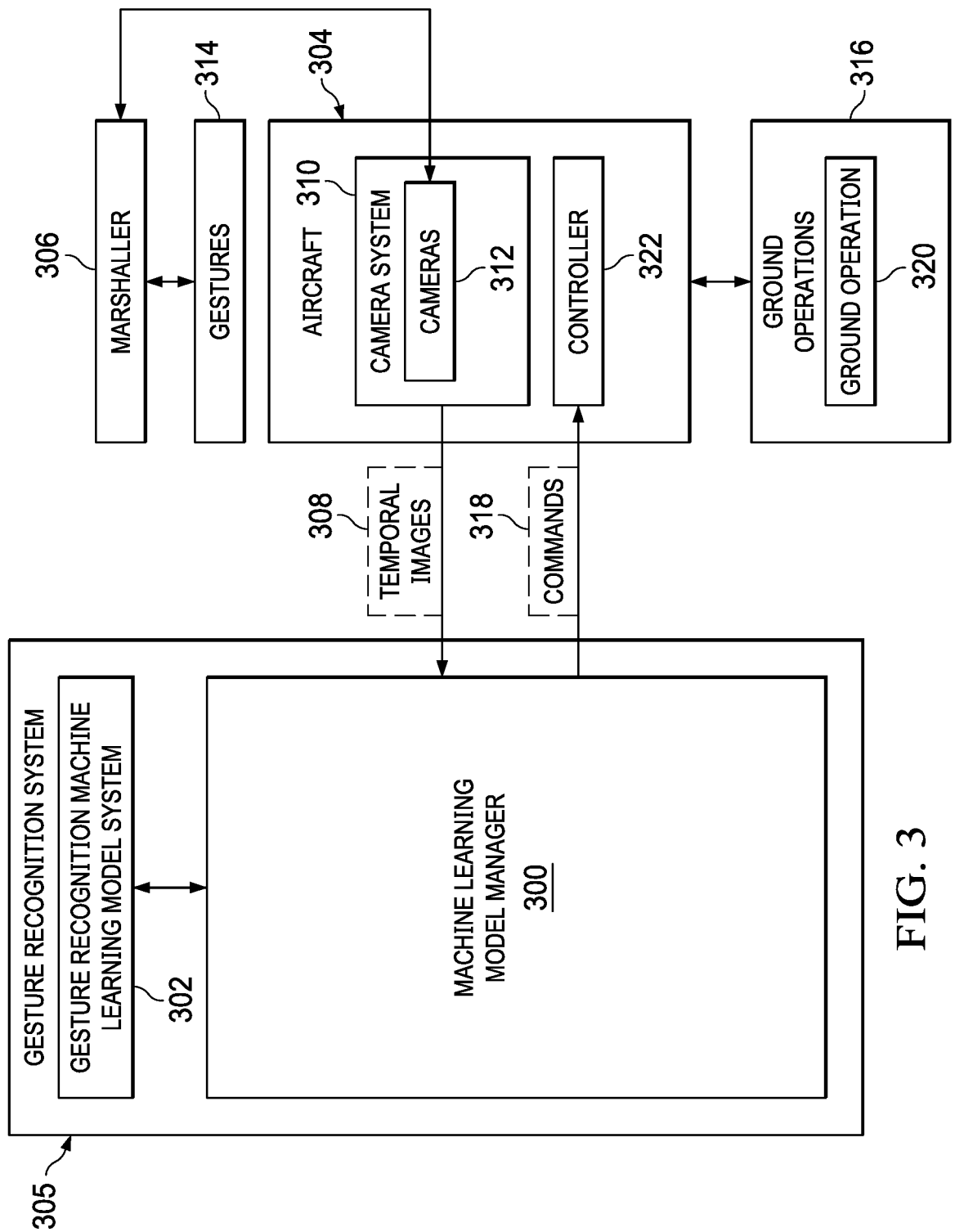
FIG. 3 is an illustration of gesture recognition performed during ground operations for an aircraft in accordance with an illustrative embodiment.

With reference next to FIG. 3, an illustration of gesture recognition performed during ground operations for an aircraft is depicted in accordance with an illustrative embodiment. In this illustrative example, at least one of machine learning model manager 300 and gesture recognition machine learning model system 302 can be located in aircraft 304 or some other location. In this illustrative example, machine learning model manager 300 and gesture recognition machine learning model system 302 form gesture recognition system 305.

As depicted, gesture recognition machine learning model system 302 can be trained by machine learning model manager 218 using training data 226 in FIG. 2. In this illustrative example, machine learning model manager 300 can be an instance of machine learning model manager 218 in FIG. 2 in which machine learning model manager 300 operates to recognize gestures 314 made by marshaller 306. In other words, a machine learning model manager, in the illustrative examples, can perform multiple functions including at least one of training machine learning models or gesture recognition of ground operations for an aircraft using trained machine learning models in a gesture machine learning model system.

In this illustrative example, machine learning model manager 300 can receive temporal images 308 of marshaller 306 from camera system 310. Camera system 310 is a hardware system and can include software. As depicted, camera system 310 includes a set of cameras 312. The set of cameras 312 can include at least one of a visible light camera, a color camera, an RGB camera, a thermal camera, or some other suitable type of camera for generating temporal images 308.

Camera system 310 can generate temporal images 308 of marshaller 306 making gestures 314. Camera system 310 can be located in aircraft 304 or some other location where marshaller 306 makes gestures 314 for aircraft 304 to perform ground operations 316.

In this illustrative example, machine learning model manager 300 receives temporal images 308 of marshaller 306 from camera system 310. As depicted, machine learning model manager 300 can identify a set of gestures 314 made by marshaller 306 using temporal images 308 and gesture recognition machine learning model system 302, which has been previously trained using training data 226 in FIG. 2. With the identification of gestures 206, machine learning model manager 300 can determine a set of commands 318 using the set of gestures 314 identified by gesture recognition machine learning model system 302.

As another feature, machine learning model manager 300 can identify marshaller 306 in temporal images 308 as an object of interest. This type of identification can be used when a pilot is present in aircraft 304. The identification of marshaller 306 can be indicated to the pilot to aid the pilot in viewing gestures 314. This indication can be made using a heads-up display or some other display system that provides for an augmented reality display of a live view of marshaller 306. A graphical indicator can be used to draw attention to the location of marshaller 306. For example, a box can be displayed that encompasses a live view of marshaller 306.

Further, machine learning model manager 300 can control ground operation 320 of aircraft 304 using a set of commands 318. As depicted, the set of commands 318 can be selected from at least one of stop, emergency stop, turn right, turn left, come ahead, cut engine, start engine, all clear, slow down, flight trim, hold position, or some other suitable command for ground operations 316.

The control of ground operation 320 for aircraft 304 can be performed in a number of different ways. For example, machine learning model manager 300 can send the set of commands 318 to controller 322 for aircraft 304 in a form used by controller 322 to control operation of aircraft 304.

In this illustrative example, controller 322 can include one or more different types of control mechanisms. For example, controller 322 can include one or more control mechanisms. These control mechanisms can be selected from at least one of a human operator, an autopilot, an autonomous flight control system, or some other suitable type of control mechanism.

The format of the set of commands 318 can vary depending on the type of controller 322. For example, when controller 322 includes a human operator, such as a pilot, the set of commands 318 can be words or audio commands. When controller 322 includes an autopilot or an autonomous flight control system, the set of commands 318 can be sent electronically in programming language used by the autopilot or the autonomous flight control system. The words in a human language can be used if the autopilot or the autonomous flight control system has natural language processing capabilities.

Figure 4:
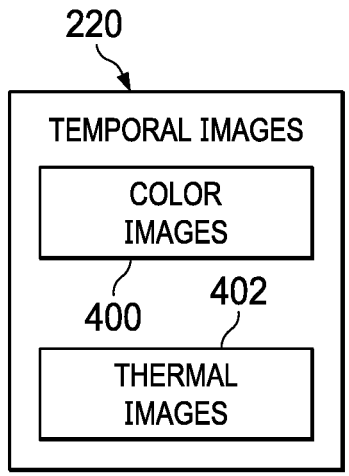
FIG. 4 is an illustration of temporal images in accordance with an illustrative embodiment.

Turning now to FIG. 4, an illustration of temporal images is depicted in accordance with an illustrative embodiment. In the illustrative example, temporal images 220 are sequential images. In other words, temporal images 220 are images that are generated in a sequence over time. Temporal images 220 can include a sequence of images that encompasses the performance of one or more of gestures 206 made by marshaller 214 in FIG. 2 or gestures 314 made by marshaller 306 in FIG. 3. In this illustrative example, temporal images 220 define actions of marshaller 214 performing one or more gestures. These actions are captured in a set of pixel movements in temporal images 220 that are sorted in a time series manner. In other words, the actions can be movements of marshaller 214 that form visual signals or communications used in ground operations in which these movements made over time are captured in temporal images 220.

In this illustrative example, temporal images 220 can include a number of different types of images. For example, temporal images 220 can include types of images selected from at least one of color images 400 or thermal images 402.

As depicted, color images 400 are digital images comprising pixels. Color information is included for each pixel in a color image in color images 400. The color space used in color images 400 can take a number of different forms. For example, the color space can be RGB, CMYK, or some other suitable color space. In this illustrative example, color images 400 are generated by a visible light digital camera.

In one illustrative example, a color image in color images 400 can have three values for each pixel when the color space is RBG. Each of these values can be referred to as a channel. As a result, the color image can be represented using values as three channels when the color space is RGB.

In this illustrative example, thermal images 402 are images generated from the detection of radiation in an infrared range which have wavelengths longer than those of visible light. This infrared range can be wavelengths, for example, from about 700 nanometers to 1 millimeter. The use of thermal images in addition to visible light images can increase at least one of the speed or accuracy that a gesture recognition machine learning model system can recognize gestures in at least one of low visibility or low light environments.

Figure 5:
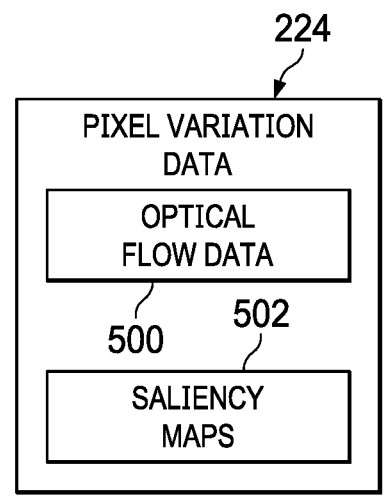
FIG. 5 is an illustration of pixel variation data in accordance with an illustrative embodiment.

With reference next to FIG. 5, an illustration of pixel variation data is depicted in accordance with an illustrative embodiment. In this figure, examples of pixel variation data 224 in FIG. 2 are shown. Pixel variation data may include at least one of optical flow data 500 or saliency maps 502.

In this illustrative example, optical flow data 500 can be generated from determining velocity. Velocity is a movement of brightness patterns on a per image basis. In other words, optical flow data 500 is used to show a pattern of motion of objects, surfaces, edges, or other elements in an image.

As depicted, saliency maps 502 can be used to show movement on a per image basis. In this illustrative example, saliency maps 502 can be generated using image segmentation. Image segmentation involves partitioning a digital image into multiple segments. These segments are sets of pixels that may also be referred to as image objects. In this depicted example, each pixel in a region can be similar with respect to a characteristic or property such as color, intensity, or texture. Saliency maps 502 can be used to train a saliency map feature machine learning model in feature machine learning models 228 to recognize features.

In one illustrative example, one or more technical solutions are present that overcome a technical problem with managing ground operations with visual signaling for autonomous unmanned aerial vehicles. As a result, one or more technical solutions can provide a technical effect in which a machine learning model system can be trained to recognize gestures made by human operators, such as a marshaller, to perform ground operations for aircraft. In one illustrative example, a set of machine learning models can be trained using temporal images and pixel variation data.

Computer system 216 in FIG. 2 can be configured to perform at least one of the steps, operations, or actions described in the different illustrative examples using software, hardware, firmware, or a combination thereof. As a result, computer system 216 operates as a special purpose computer system in which machine learning model manager 218 in FIG. 2 in computer system 216 enables training machine learning models in a manner that provides increased accuracy in classifying hand signals made by human operators. In other words, machine learning model manager 218 can enable generating commands for gestures such as hand signals made by human operators for performing ground operations with aircraft, such as autonomous unmanned vehicles, as well as other types of aircraft. In particular, machine learning model manager 218 transforms computer system 216 into a special purpose computer system as compared to currently available general computer systems that do not have machine learning model manager 218.

In the illustrative example, the use of machine learning model manager 218 in computer system 216 integrates processes into a practical application for training machine learning models for use in a gesture recognition machine learning model system that increases the performance of computer system 216 in recognizing gestures made for ground operations when using the trained gesture recognition machine learning model system.

The illustration of gesture recognition environment 200 and the different components in FIGS. 2-5 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, hand signal recognition can also be performed for unmanned aerial vehicles. For example, with unmanned aerial vehicles operated by a remote human operator, a video displayed to the human operator may not be as clear as desired. Further, with manned aerial vehicles, the use of gesture recognition for ground operations can reduce the workload on pilots of the manned aerial vehicles. For example, a single-pilot aircraft can benefit from workload reduction using a hand signal recognition system to determine commands for the pilot of the single-pilot aircraft.

As another example, machine learning model manager 218 and gesture recognition machine learning model system 204 in FIG. 2 are shown in a single block. In a similar fashion, machine learning model manager 300 and gesture recognition machine learning model system 302 are also depicted in a single block in FIG. 3. The illustration of these components in a single block does not imply limitations to where these components can be located.

For example, both a machine learning model manager and a gesture recognition machine learning model system can be located in an aircraft, an operation center, or some other location. In other illustrative examples, these components can be distributed in different locations. For example, a machine learning model manager can be located in an aircraft while a gesture recognition machine learning model system can be located in a remote location to the aircraft.

As a further example, a machine learning model manager can be used with multiple gesture recognition machine learning model systems for different aircraft. Additionally, the machine learning model manager can be used with multiple gesture recognition machine learning model systems in which different sets of gestures in temporal images received during actual ground operations can be processed by the multiple gesture recognition machine learning model systems to recognize gestures made by one or more marshallers.

Figure 6:
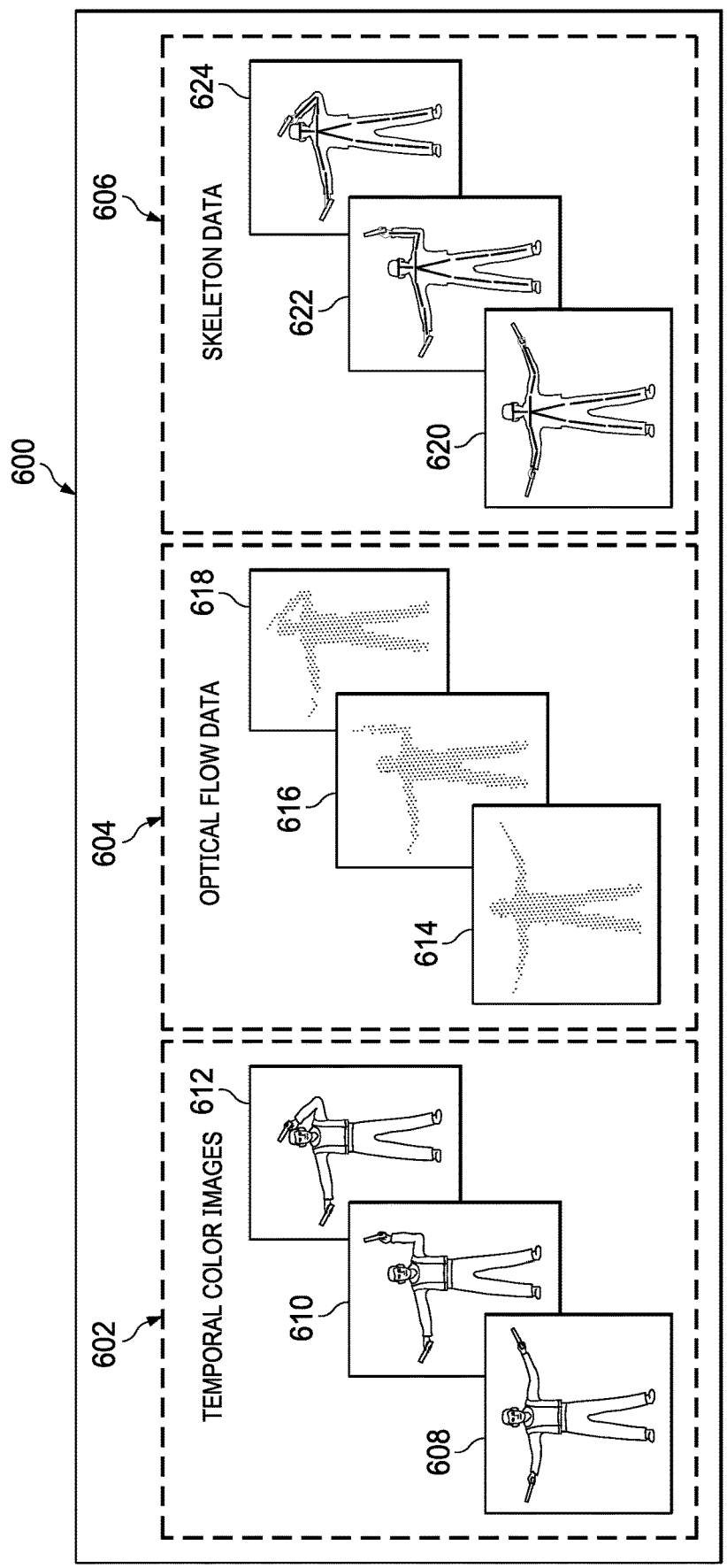
FIG. 6 is a pictorial illustration of training data in accordance with an illustrative embodiment.

Turning to FIG. 6, a pictorial illustration of training data is depicted in accordance with an illustrative embodiment. In this illustrative example, training data 600 is an example of training data 226 in FIG. 2. Training data 600 comprises temporal color images 602, optical flow data 604, and skeleton data 606.

Temporal color images 602 show a marshaller making a gesture through movements over time. In this illustrative example, temporal color images 602 are shown sequentially in the order of color image 608, color image 610, and color image 612. This series of color images forms temporal color images 602 for a gesture for a ground operation for an aircraft made by a marshaller.

In this illustrative example, optical flow data 604 comprises images that can also be referred to as frames. In this illustrative example, optical flow data 604 comprises frame 614, frame 616, and frame 618 corresponding to color image 608, color image 610, and color image 612, respectively. Each of these frames illustrates the distribution of visual velocities of movement of brightness patterns on a per image basis from the color images.

As depicted, skeleton data 606 comprises frame 620, frame 622, and frame 624 corresponding to color image 608, color image 610, and color image 612, respectively. Each of these frames of skeleton data 606 shows joints and bones identified for the marshaller making a gesture in temporal color images 602. As depicted, skeleton data 606 can show the movement made over time by the joints and bones identified from temporal color images 602.

In this illustrative example, skeleton data 606 comprises the joints and bones overlaid on temporal color images 602. In other illustrative examples, only the joints and bones may be shown without the rest of the information in temporal color images 602.

This illustration of training data 600 is not meant to limit the manner in which training data may be selected in other illustrative examples. For example, training data 600 may include saliency maps in addition to or in place of flow data in other implementations. In yet another illustrative example, skeleton data may be omitted from training data 600.

Figure 7:
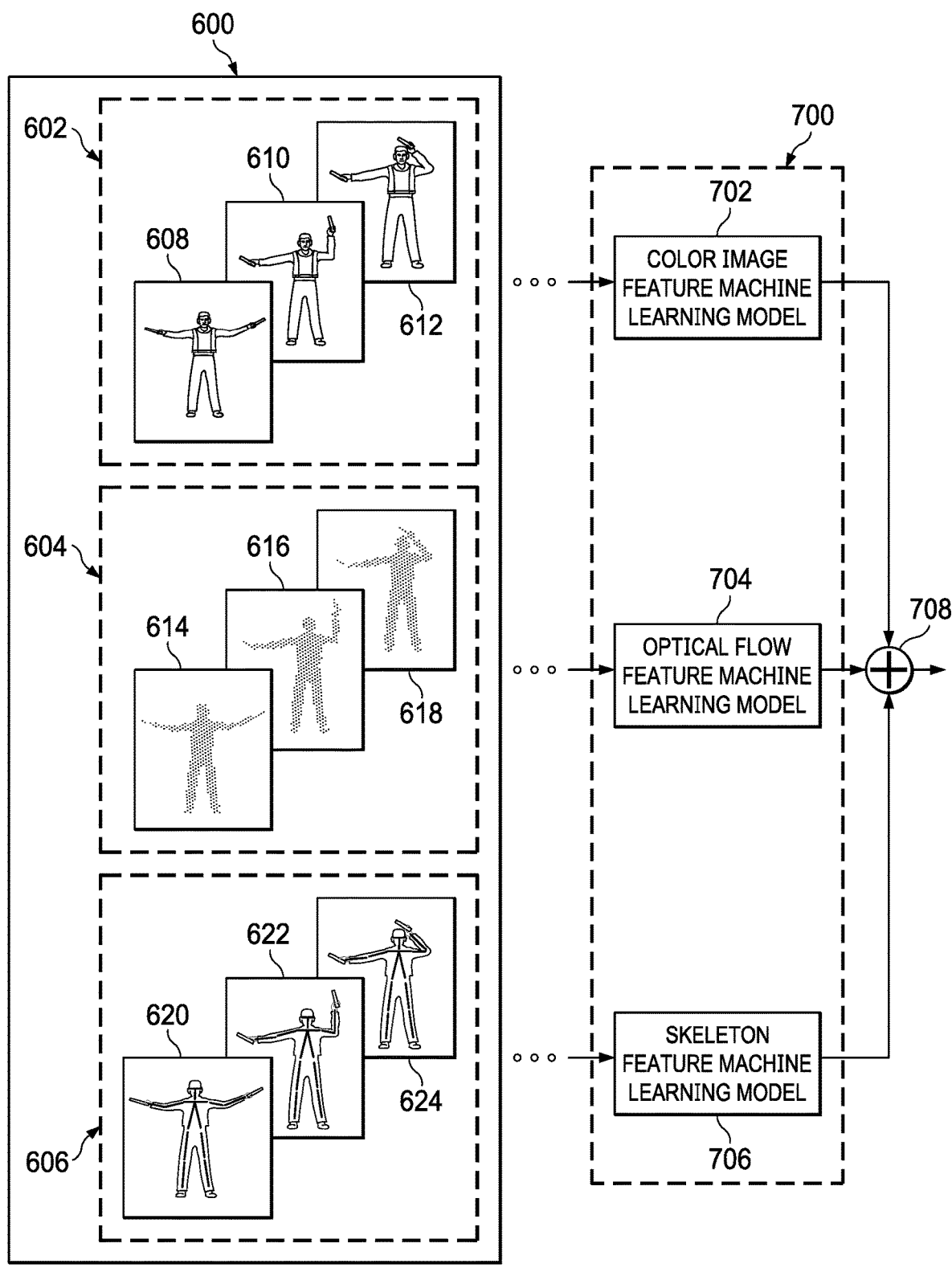
FIG. 7 is an illustration of training machine learning models to recognize features in accordance with an illustrative embodiment.

With reference next to FIG. 7, an illustration of training machine learning models to recognize features is depicted in accordance with an illustrative embodiment. As depicted, feature machine learning models 700 can be implemented using deep neural networks and can be trained to recognize features in temporal color images 602 using training data 600 in FIG. 6.

As depicted, temporal color images 602 are used to train color image feature machine learning model 702 in feature machine learning models 700 to learn gestures with objects. In this illustrative example, optical flow data 604 is used to train optical flow feature machine learning model 704 in feature machine learning models 700 to learn movements; and skeleton data 606 is used to train skeleton feature machine learning model 706 in feature machine learning models 700.

Selector 708 can receive features detected by each of the machine learning models. Output used for the features is the features from the machine learning model having the highest confidence level.

Figure 8:
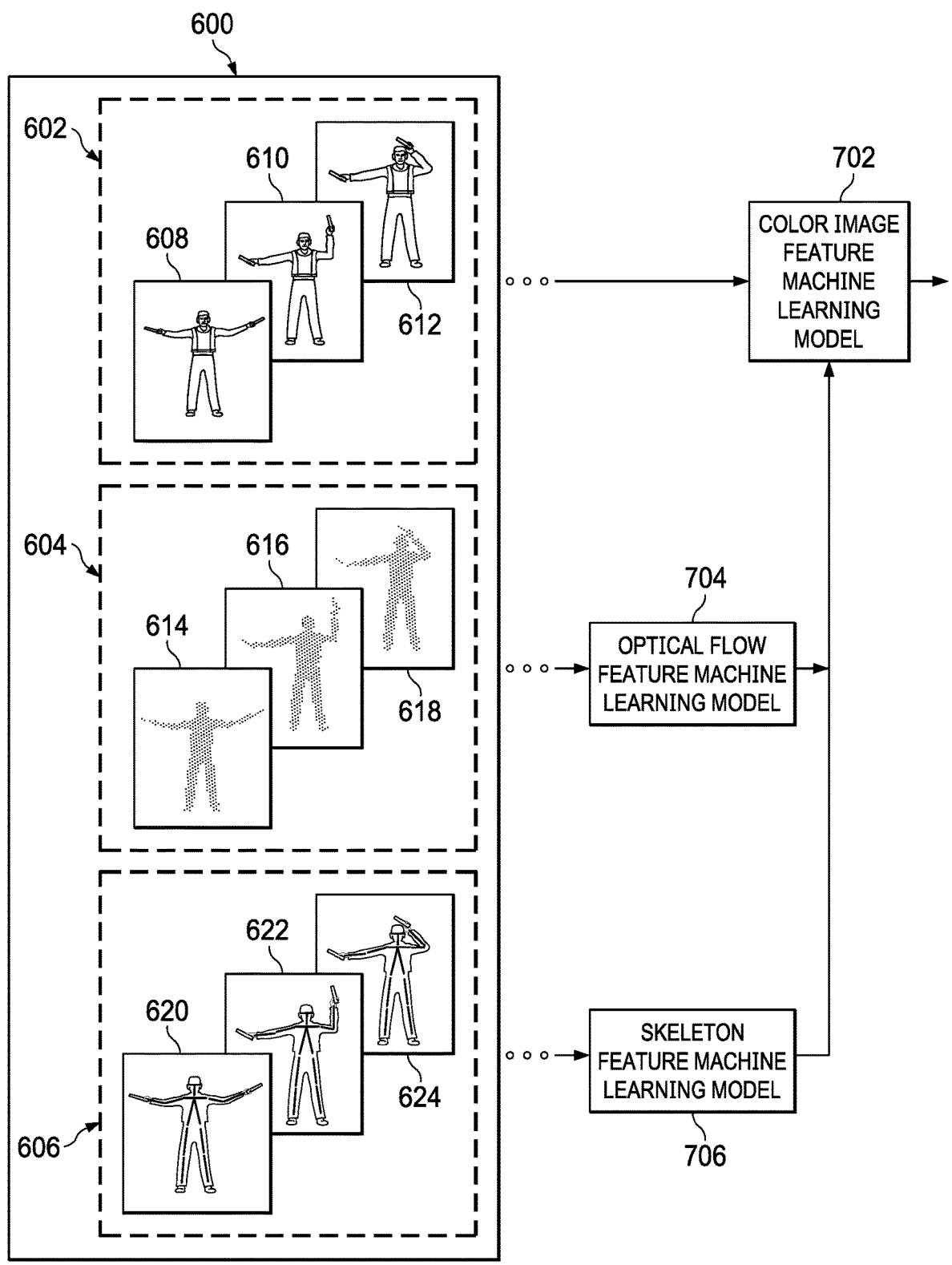
FIG. 8 is an illustration of training machine learning models to recognize features in accordance with an illustrative embodiment.

Turning next to FIG. 8, an illustration of training machine learning models to recognize features is depicted in accordance with an illustrative embodiment. In this depicted example, color image feature machine learning model 702, optical flow feature machine learning model 704, and skeleton feature machine learning model 706 are trained in the same manner as described in FIG. 7.

In this illustrative example, the training also includes sending features detected by optical flow feature machine learning model 704 and skeleton feature machine learning model 706 into color image feature machine learning model 702 as part of the training process. In training color image feature machine learning model 702, the timing of training data can be such that temporal color images 602 and features identified by optical flow feature machine learning model 704 and skeleton feature machine learning model 706 are correlated to each other in sending temporal color images 602 and features into color image feature machine learning model 702 for training. For example, a color image can be sent into color image feature machine learning model 702 at the same time the features identified in that color image are sent into color image feature machine learning model 702.

In one illustrative example, the training of color image feature machine learning model 702 can be performed using knowledge distillation which is model compression method in which a model can be trained to mimic a pre-trained set of larger models. This training setting is sometimes referred to as "teacher-student", where the large model is the teacher model.

In distillation, knowledge is transferred from a set of teacher models to the student model by minimizing a loss function in which the target is the distribution of class probabilities predicted by the teacher model. In this depicted example, the optical flow feature machine learning model 704 and skeleton feature machine learning model 706 operate as teacher models for training color image feature machine learning model 702.

In this illustrative example, color image feature machine learning model 702 can be used with one or more classifier machine learning models to form a gesture recognition machine learning model system, such as gesture recognition machine learning model system 204 in FIG. 2 or gesture recognition machine learning model system 302 in FIG. 3.

Figure 9:
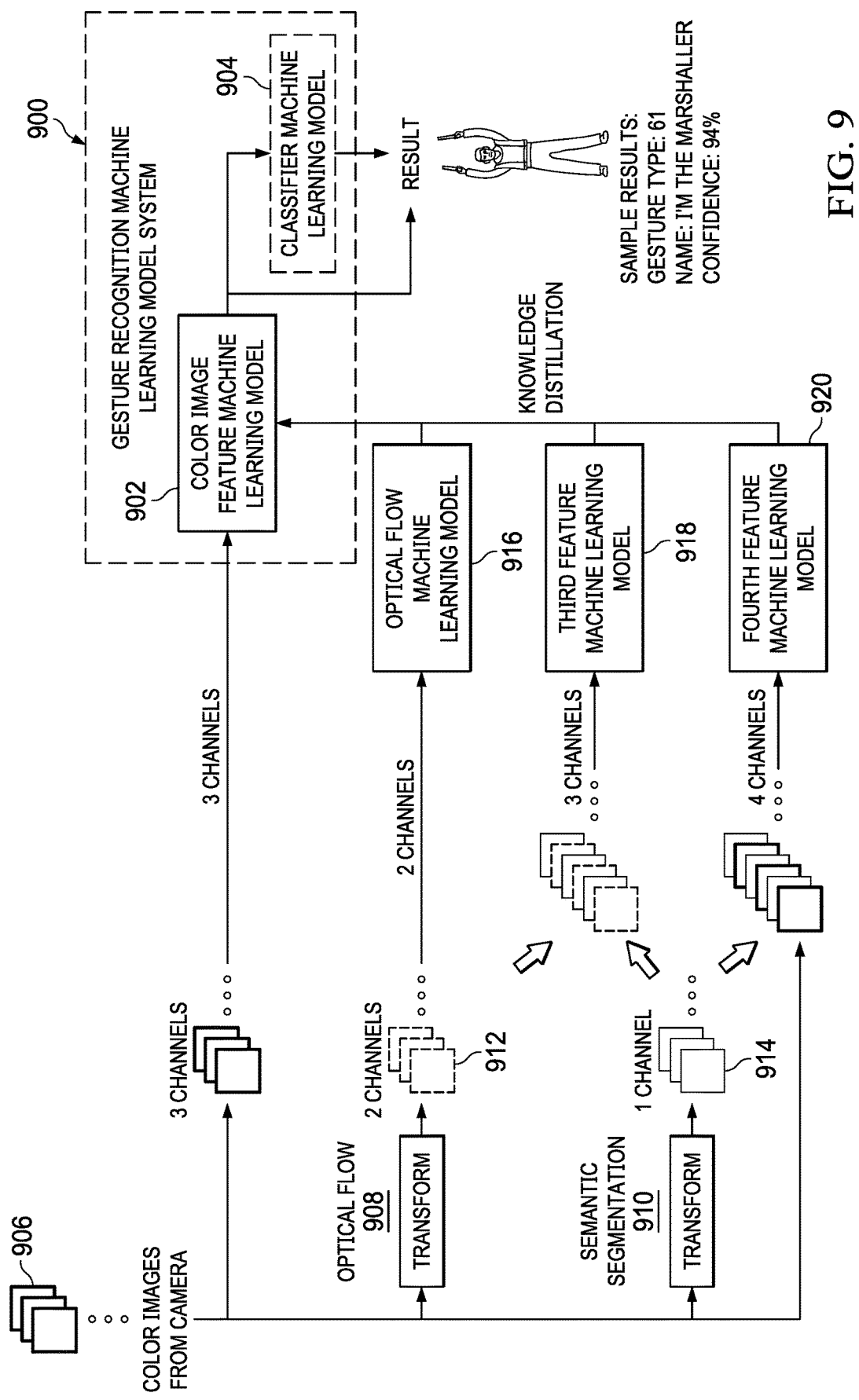
FIG. 9 is an illustration of training machine learning models to recognize gestures in accordance with an illustrative embodiment.

With reference to FIG. 9, an illustration of training machine learning models to recognize gestures is depicted in accordance with an illustrative embodiment. In this illustrative example, gesture recognition machine learning model system 900 is an example of an implementation such as gesture recognition machine learning model system 204 in FIG. 2 and gesture recognition machine learning model system 302 in FIG. 3.

As depicted, gesture recognition machine learning model system 900 comprises training color image feature machine learning model 902 and classifier machine learning model 904. In this depicted example, color images 906 are used for training color image feature machine learning model 902. In this example, knowledge distillation is also used to train color image feature machine learning model 902 using optical flow feature machine learning model 916, third feature machine learning model 918, and fourth feature machine learning model 920.

As depicted, color images 906 are images generated by an optical camera system. Additionally, color images 906 are temporal images capturing one or more gestures made by one or more marshallers over time. Color images 906 have three channels when using a color map, such as RGB.

Additionally, color images 906 are used to derive pixel variation data. In this depicted example, color images 906 are sent to optical flow transform 908 and semantic segmentation transform 910 to generate the pixel variation data used for training.

As depicted, optical flow transform 908 generates optical flow data 912 having two channels. In this example, two channels can be present for optical flow data 912 when optical flow data 912 comprises frames with black-and-white pixels to identify movement on a per image basis from color images 906.

Semantic segmentation transform 910 generates saliency maps 914 in a single channel. Saliency maps 914 identify movement using color on a per image basis. In this illustrative example, color images 906, optical flow data 912, and saliency maps 914 along with metadata (not shown) form the training data.

Optical flow data 912 and saliency maps 914 are organized on a per image basis. As a result, this type of data can be images, which can also be referred to as frames. The organization and other information such as information about images, frames, number of channels, height and width of images and frames, or other suitable information can be placed into metadata (not shown) that is also used for training.

The different types of training data may be selected and combined to train color image feature machine learning model 902. As depicted, color images 906 can be used to directly train color image feature machine learning model 902.

Color images 906, optical flow data 912, and saliency maps 914 can be used indirectly to train color image feature machine learning model 902. In other words, this training data can be used to train other machine learning models that generate features that are then used as inputs into training color image feature machine learning model 902.

In this illustrative example, color image feature machine learning model 902 can have kinetics-based pre-training weights. These pretraining weights can be obtained from previously trained machine learning models. In this illustrative example, kinetics-based pre-training weights can be obtained from training a machine learning model from a kinetics human action video data set of video clips that cover human action classes including human-object interactions.

For example, optical flow data 912 can be used to train optical flow feature machine learning model 916. In this example, optical flow feature machine learning model 916 can also include kinetics-based pre-training weights prior to being trained using optical flow data 912.

Additionally, optical flow data 912 and saliency maps 914 can be used to train third feature machine learning model 918. Saliency maps 914 can be combined with color images 906 to train fourth feature machine learning model 920. The features are recognized by these three machine learning models, optical flow feature machine learning model 916, third feature machine learning model 918, and fourth feature machine learning model 920. The features recognized by these feature machine learning models can be input into color image feature machine learning model 902 using knowledge distillation as part of the training of this machine learning model along with color images 906.

In this illustrative example, classifier machine learning model 904 is trained using features by color image feature machine learning model 902. In these illustrative examples, metadata can be included in the training data that provides identifications of gestures that correspond to particular sets of images in color images 906. For example, labels can be associated with color images 906 to identify a series of color images that are for a particular gesture.

The illustrative examples for training machine learning models in FIGS. 7-9 are provided as examples of some implementations for training machine learning models using temporal images and pixel variation data. These examples are not meant to limit the manner in which other illustrative examples can be implemented. For example, the temporal images shown in these figures are color images. In other illustrative examples, thermal images may be used in place of or in addition to color images. The use of thermal images can aid in increasing accuracy in feature recognition and gesture detection in less-than-optimal lighting conditions.

Figure 10:
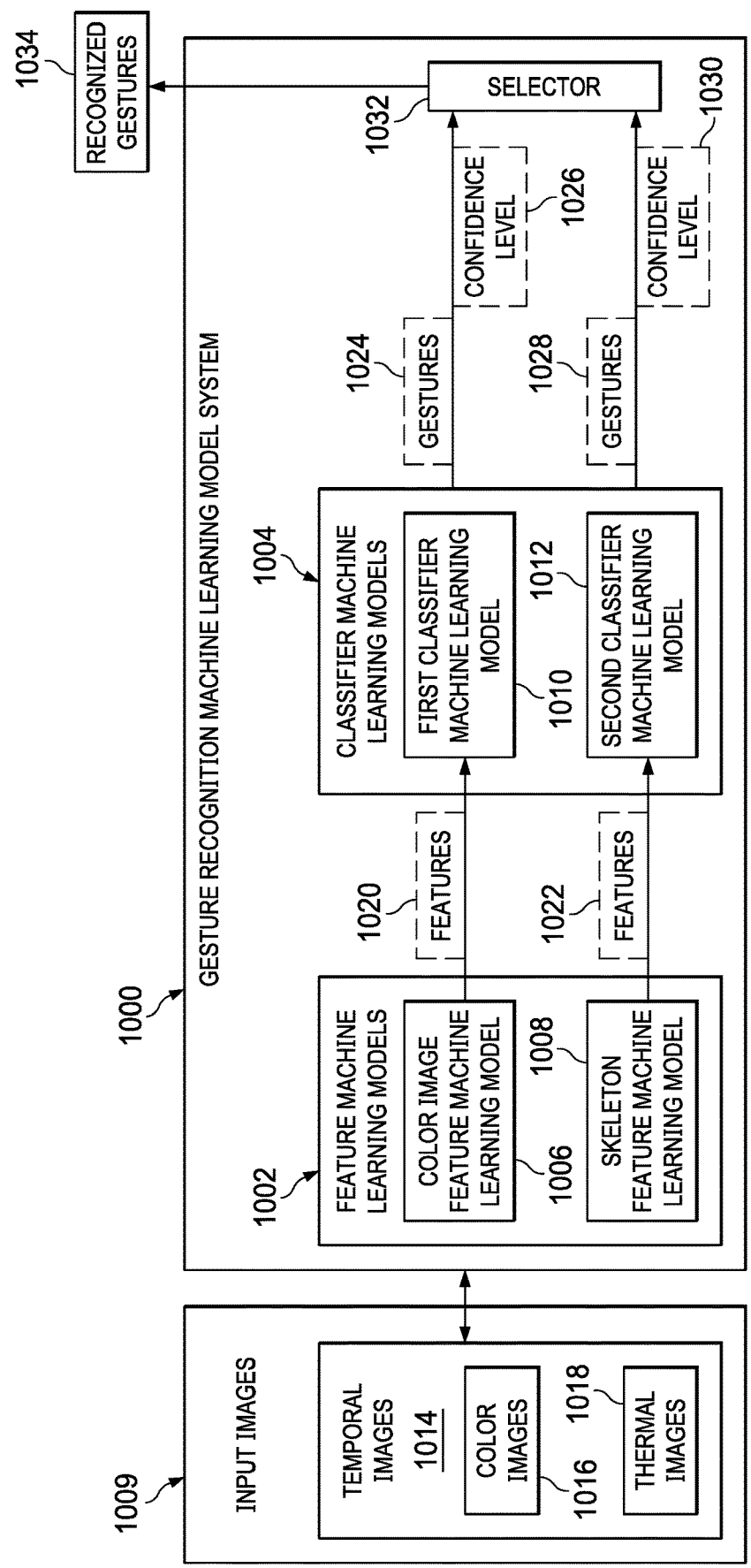
FIG. 10 is an illustration of a gesture recognition machine learning model system in accordance with an illustrative embodiment.

Turning next to FIG. 10, an illustration of a gesture recognition machine learning model system is depicted in accordance with an illustrative embodiment. In this particular example, gesture recognition machine learning model system 1000 is an example of another implementation for gesture recognition machine learning model system 204 in FIG. 2 or gesture recognition machine learning model system 302 in FIG. 3. As depicted, gesture recognition machine learning model system 1000 comprises feature machine learning models 1002 and classifier machine learning models 1004. These machine learning models can be implemented using deep neural networks or convolutional neural networks.

As depicted, feature machine learning models 1002 comprise color image feature machine learning model 1006 and skeleton feature machine learning model 1008. Both of these feature machine learning models have been trained using temporal images and pixel variation data. These models can be trained using training processes in training data such as those described in FIGS. 7-9.

Classifier machine learning models 1004 can comprise first classifier machine learning model 1010 and second classifier machine learning model 1012. In this example, first classifier machine learning model 1010 has been trained using features received from color image feature machine learning model 1006, and second classifier machine learning model 1012 has been trained using features from skeleton feature machine learning model 1008.

In this illustrative example, input images 1009 in the form of temporal images 1014 can be sent to feature machine learning models 1002. As depicted, temporal images 1014 are images in a temporal sequence that capture gestures made by human operators, such as marshallers, making gestures to perform ground operations for an aircraft. Temporal images 1014 can include at least one of color images 1016 or thermal images 1018. Color images 1016 and thermal images 1018 can be generated by a camera system that includes both a visible light camera and an infrared camera.

Each of feature machine learning models 1002 can recognize features and temporal images 1014. For example, color image feature machine learning model 1006 can output features 1020 that are sent to first classifier machine learning model 1010. Skeleton feature machine learning model 1008 can output features 1022 that are sent to second classifier machine learning model 1012.

In response to receiving features 1020 from color image feature machine learning model 1006, first classifier machine learning model 1010 can output a set of gestures 1024 with confidence level 1026. Second classifier machine learning model 1012 can output a set of gestures 1028 with confidence level 1030 based on features 1022 received from skeleton feature machine learning model 1008.

In this illustrative example, gesture recognition machine learning model system 1000 further comprises selector 1032. As depicted, selector 1032 can select one of gestures 1024 or gestures 1028 to output as a set of recognized gestures 1034 in temporal images 1014. The selection of the gestures can be based on confidence level 1026 for gestures 1024 and confidence level 1030 for gestures 1028. The set of recognized gestures 1034 can then be used to generate commands to control ground operations for an aircraft.

Figure 11:
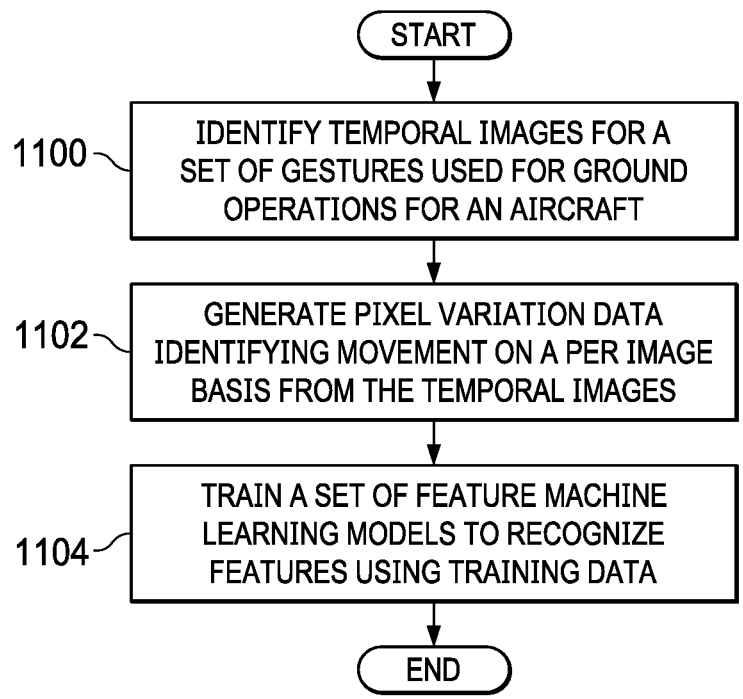
FIG. 11 is an illustration of a flowchart of a process for training a feature machine learning model system in accordance with an illustrative embodiment.

Turning next to FIG. 11, an illustration of a flowchart of a process for training a feature machine learning model system is depicted in accordance with an illustrative embodiment. The process in FIG. 11 can be implemented in hardware, software, or both. When implemented in software, the process can take the form of program code that is run by one or more processor units located in one or more hardware devices in one or more computer systems. For example, the process can be implemented in machine learning model manager 218 in computer system 216 in FIG. 2.

The process begins by identifying temporal images for a set of gestures used for ground operations for an aircraft (operation 1100). The process generates pixel variation data identifying movement on a per image basis from the temporal images (operation 1102). In operation 1102, the temporal images and the pixel variation data form training data.

The process trains a set of feature machine learning models to recognize features using training data (operation 1104). The process terminates thereafter.

Figure 12:
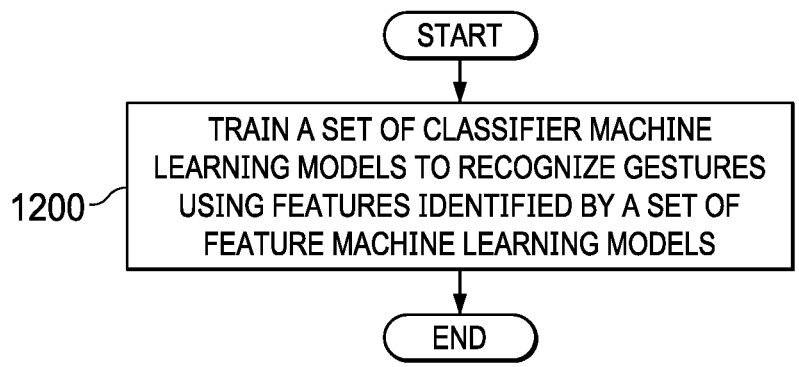
FIG. 12 is an illustration of a flowchart of a process for training a feature machine learning model system in accordance with an illustrative embodiment.

With reference now to FIG. 12, an illustration of a flowchart of a process for training a feature machine learning model system is depicted in accordance with an illustrative embodiment. The operation in this process is an example of an additional operation that can be performed in the process in FIG. 11.

The process trains a set of classifier machine learning models to recognize gestures using features identified by a set of feature machine learning models (operation 1200). The process terminates thereafter. In operation 1200, the set of feature machine learning models and the set of classifier machine learning models form a gesture recognition machine learning model system.

Figure 13:
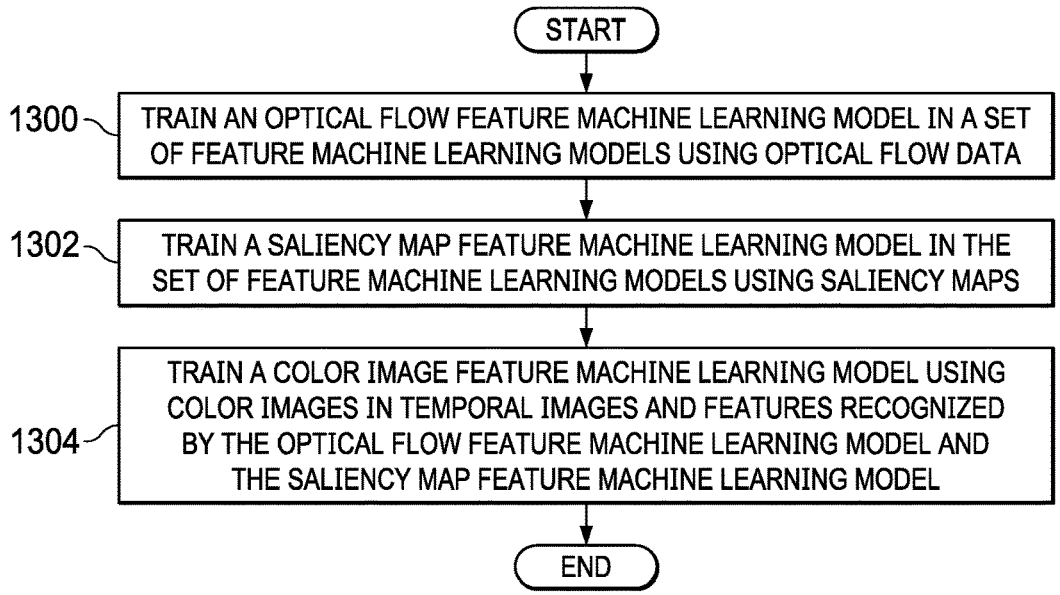
FIG. 13 is an illustration of a flowchart of a process for feature machine learning models in accordance with an illustrative embodiment.

Turning now to FIG. 13, an illustration of a flowchart of a process for feature machine learning models is depicted in accordance with an illustrative embodiment. The process in this figure is an example of one manner in which operation 1104 in FIG. 11 can be implemented. In this example, pixel variation data comprises optical flow data on a per image basis and saliency maps on the per image basis.

The process begins by training an optical flow feature machine learning model in a set of feature machine learning models using optical flow data (operation 1300). The process trains a saliency map feature machine learning model in the set of feature machine learning models using saliency maps (operation 1302).

The process trains a color image feature machine learning model using color images in temporal images and features recognized by the optical flow feature machine learning model and the saliency map feature machine learning model (operation 1304). The process terminates thereafter.

Figure 14:
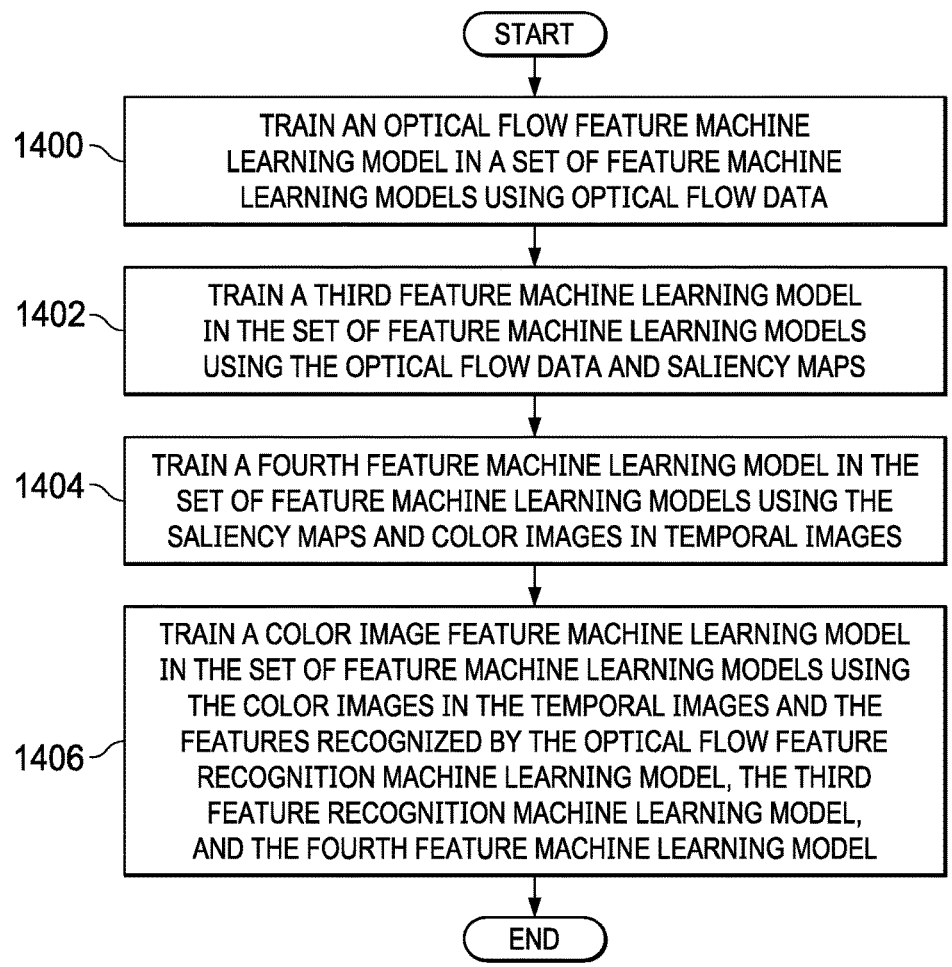
FIG. 14 is an illustration of a flowchart of a process for feature machine learning models in accordance with an illustrative embodiment.

In FIG. 14, an illustration of a flowchart of a process for feature machine learning models is depicted in accordance with an illustrative embodiment. The process in this figure is another example of one manner in which operation 1104 in FIG. 11 can be implemented. In this example, pixel variation data comprises optical flow data on a per image basis and saliency maps on the per image basis.

The process beings by training an optical flow feature machine learning model in a set of feature machine learning models using optical flow data (operation 1400). The process trains a third feature machine learning model in the set of feature machine learning models using the optical flow data and saliency maps (operation 1402). The process trains a fourth feature machine learning model in the set of feature machine learning models using the saliency maps and color images in temporal images (operation 1404).

The process trains a color image feature machine learning model in the set of feature machine learning models using the color images in the temporal images and the features recognized by the optical flow feature recognition machine learning model, the third feature recognition machine learning model, and the fourth feature machine learning model (operation 1406). The process terminates thereafter.

Figure 15:
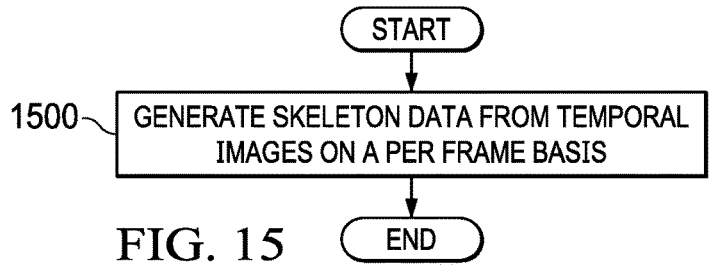
FIG. 15 is an illustration of a flowchart of a process for training a feature machine learning model system in accordance with an illustrative embodiment.

With reference now to FIG. 15, an illustration of a flowchart of a process for training a feature machine learning model system is depicted in accordance with an illustrative embodiment. The operation in this process is an example of an additional operation that can be performed in the process in FIG. 11.

The process generates skeleton data from temporal images on a per frame basis (operation 1500). The process terminates thereafter. The skeleton data describes poses of a human operator in the temporal images. When operation 1500 is present in the process, the training data now comprises the temporal images, pixel variation data, and skeleton data.

Figure 16:
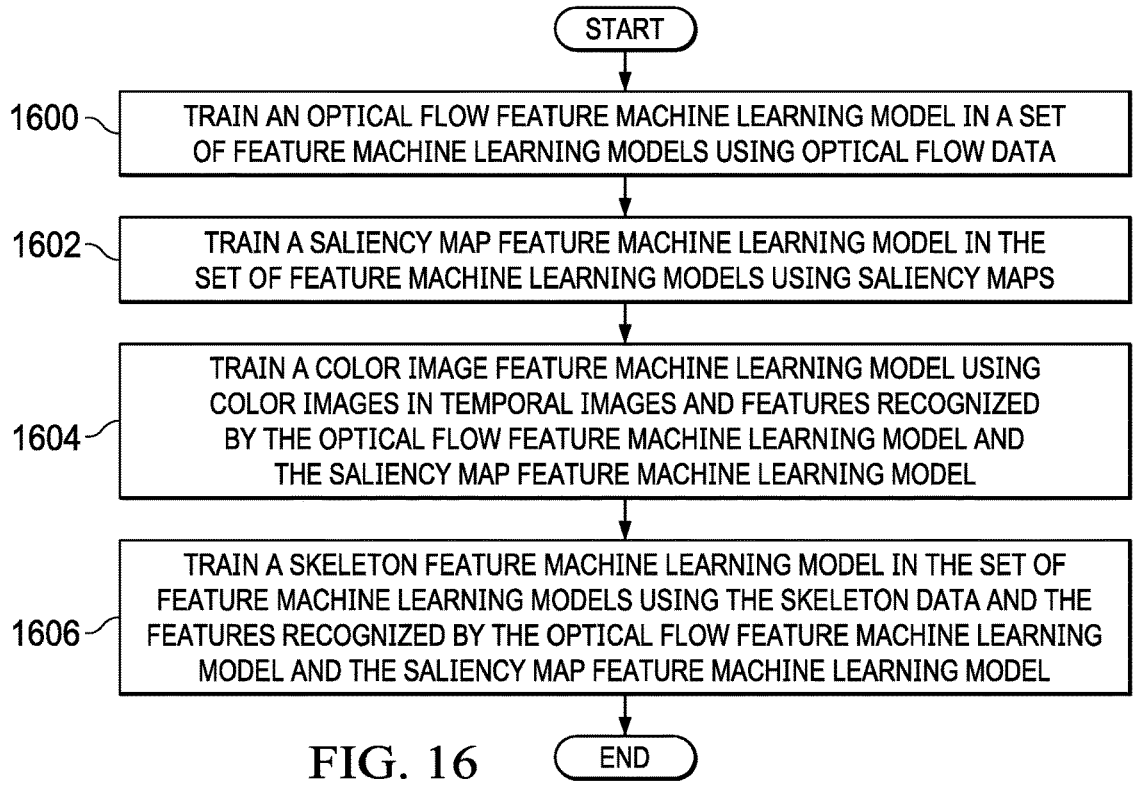
FIG. 16 is an illustration of a flowchart of a process for training a gesture recognition machine learning model system in accordance with an illustrative embodiment.

With reference to FIG. 16, an illustration of a flowchart of a process for training a gesture recognition machine learning model system is depicted in accordance with an illustrative embodiment. The operations in this flowchart are an example of one implementation for operation 1104 in FIG. 11 when operation 1500 in FIG. 15 is present in the process. In this illustrative example, pixel variation data comprises optical flow data on a per image basis and a saliency map on the per image basis.

The process begins by training an optical flow feature machine learning model in a set of feature machine learning models using optical flow data (operation 1600). The process trains a saliency map feature machine learning model in the set of feature machine learning models using saliency maps (operation 1602). The process trains a color image feature machine learning model using color images in temporal images and features recognized by the optical flow feature machine learning model and the saliency map feature machine learning model (operation 1604).

The process trains a skeleton feature machine learning model in the set of feature machine learning models using skeleton data and the features recognized by the optical flow feature machine learning model and the saliency map feature machine learning model (operation 1606). The process terminates thereafter.

Figure 17:
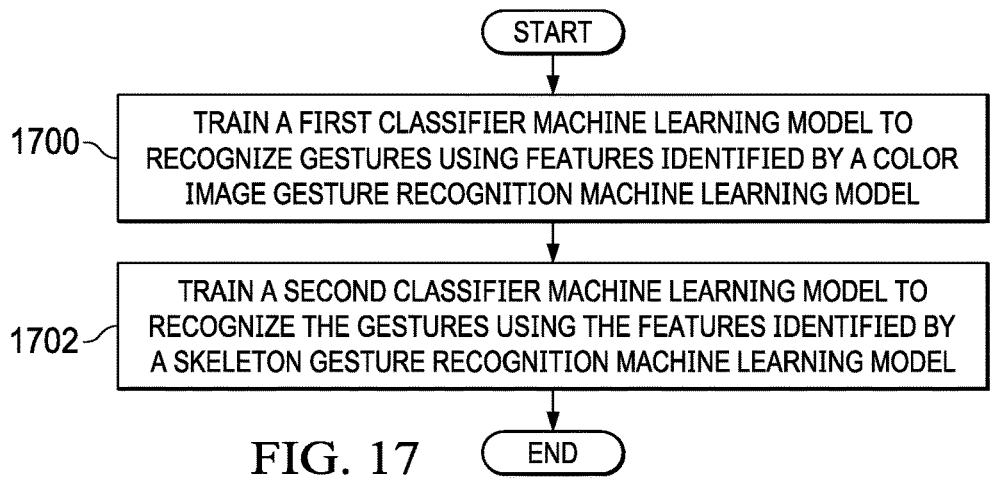
FIG. 17 is an illustration of a flowchart of a process for training classifier machine learning models in accordance with an illustrative embodiment.

Turning to FIG. 17, an illustration of a flowchart of a process for training classifier machine learning models is depicted in accordance with an illustrative embodiment. Operations in this flowchart can be performed to train classifier machine learning models for use with a color image feature machine learning model and a skeleton feature machine learning model trained in FIG. 16.

The process trains a first classifier machine learning model to recognize gestures using features identified by a color image gesture recognition machine learning model (operation 1700). In this illustrative example, the first classifier machine learning model can be trained using features output by a color image feature machine learning model during training of this machine learning model.

The process trains a second classifier machine learning model to recognize the gestures using the features identified by a skeleton gesture recognition machine learning model (operation 1702). The process terminates thereafter. This second classifier machine learning model can be trained using the features output by the skeleton feature machine learning model during training of the skeleton feature machine learning model.

Figure 18:
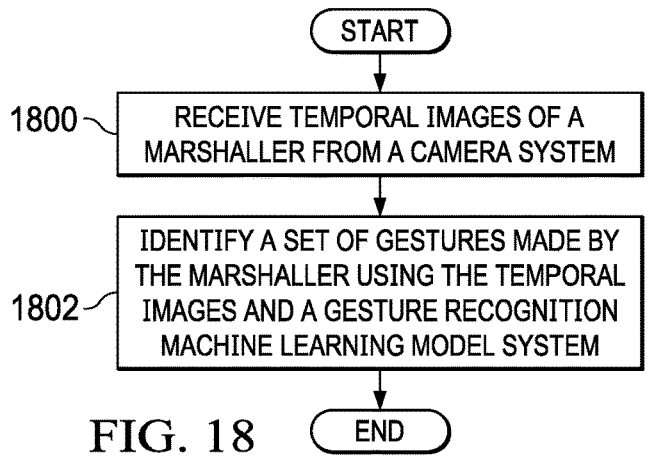
FIG. 18 is an illustration of a flowchart of a process for recognizing gestures using a gesture recognition machine learning model system in accordance with an illustrative embodiment.

Turning next to FIG. 18, an illustration of a flowchart of a process for recognizing gestures using a gesture recognition machine learning model system is depicted in accordance with an illustrative embodiment. The process in FIG. 18 can be implemented in hardware, software, or both. When implemented in software, the process can take the form of program code that is run by one or more processor units located in one or more hardware devices in one or more computer systems. For example, the process can be implemented in machine learning model manager 218 in computer system 216 in FIG. 2. In this example, machine learning model manager 218 can perform the different operations using gesture recognition machine learning model system 204 in FIG. 2.

The process begins by receiving temporal images of a marshaller from a camera system (operation 1800). The process identifies a set of gestures made by the marshaller using the temporal images and a gesture recognition machine learning model system (operation 1802). The process terminates thereafter.

Figure 19:
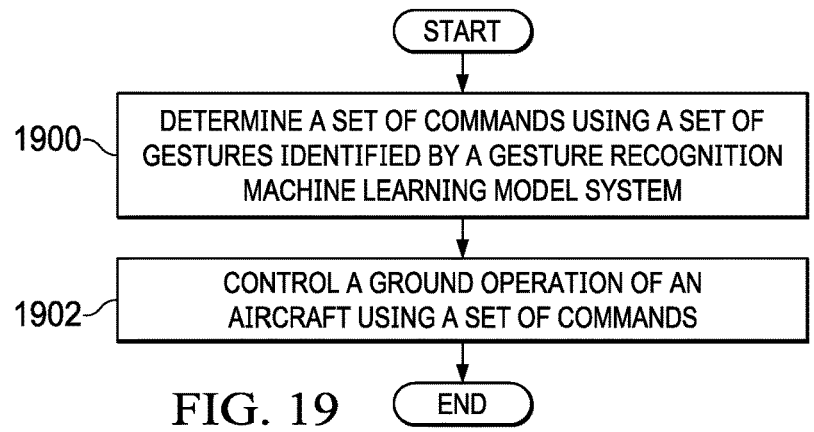
FIG. 19 is an illustration of a flowchart of a process for controlling ground operations using recognized gestures in accordance with an illustrative embodiment.

Turning next to FIG. 19, an illustration of a flowchart of a process for controlling ground operations using recognized gestures is depicted in accordance with an illustrative embodiment. The process in this flowchart illustrates operations that can be performed after operation 1802 in FIG. 18 to control ground operations for an aircraft.

The process determines a set of commands using a set of gestures identified by a gesture recognition machine learning model system (operation 1900). The process controls a ground operation of an aircraft using a set of commands (operation 1902). The process terminates thereafter. In operation 1902, the process can control the ground operation by sending the set of commands to a controller for the aircraft in a form used by the controller to control operation of the aircraft.

Figure 20:
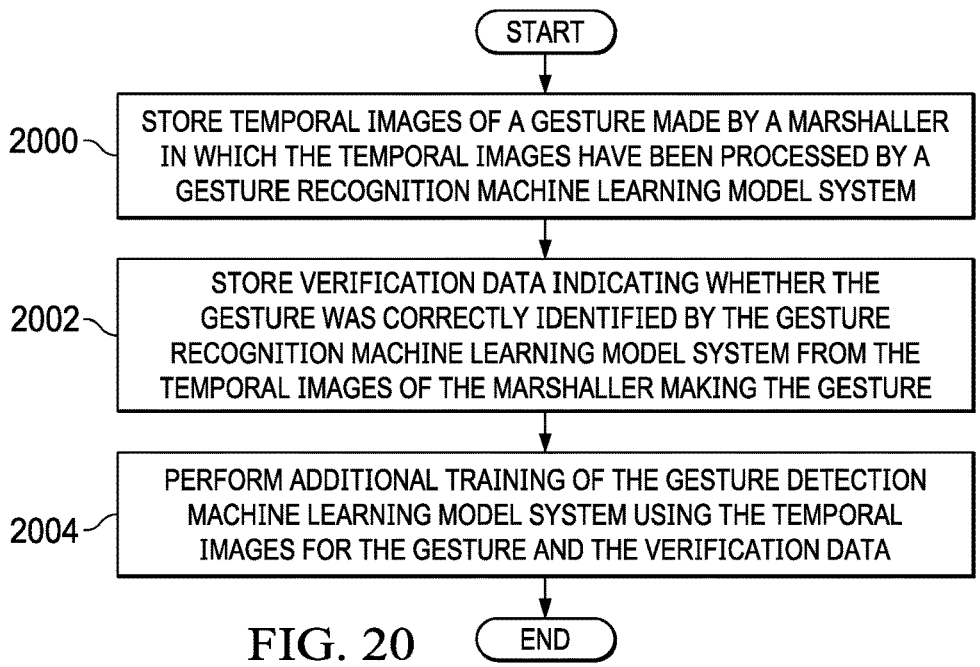
FIG. 20 is an illustration of a flowchart of a process for performing further training of a gesture recognition machine learning model system in accordance with an illustrative embodiment.

Turning next to FIG. 20, an illustration of a flowchart of a process for performing further training of a gesture recognition machine learning model system is depicted in accordance with an illustrative embodiment. The process in FIG. 20 can be implemented in hardware, software, or both. When implemented in software, the process can take the form of program code that is run by one or more processor units located in one or more hardware devices in one or more computer systems. For example, the process can be implemented in machine learning model manager 218 in computer system 216 in FIG. 2.

The process begins by storing temporal images of a gesture made by a marshaller in which the temporal images have been processed by a gesture recognition machine learning model system (operation 2000). The process stores verification data indicating whether the gesture was correctly identified by the gesture recognition machine learning model system from the temporal images of the marshaller making the gesture (operation 2002).

The process performs additional training of the gesture detection machine learning model system using the temporal images for the gesture and the verification data (operation 2004). The process terminates thereafter. In this illustrative example, the additional training can be performed a number of different times. For example, the additional training in operation 2004 can be performed periodically, after some number of failures to identify correct gestures, when a selected number of gestures has been saved, or after some other suitable event.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 21:
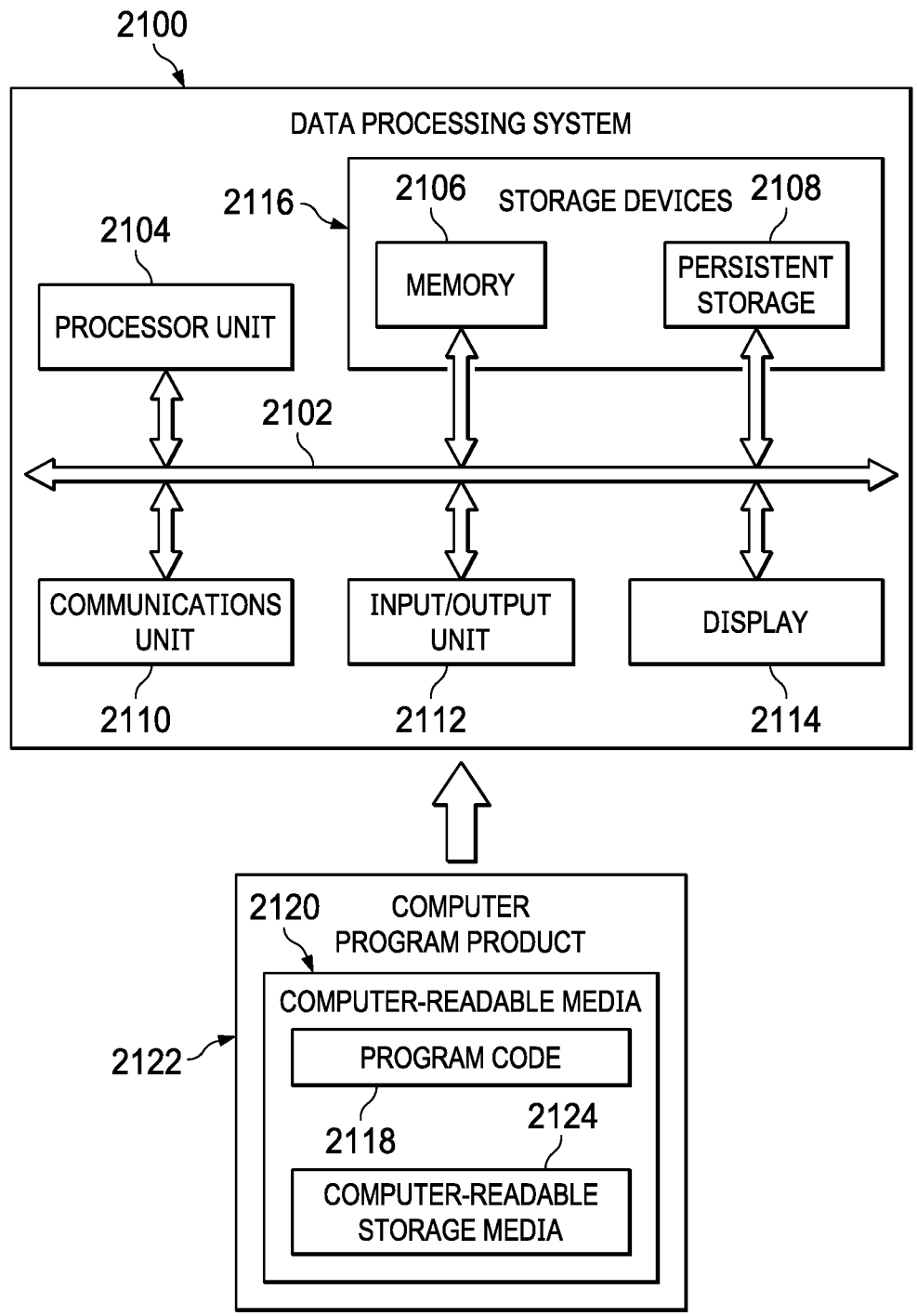
FIG. 21 is an illustration of a block diagram of a data processing system in accordance with an illustrative embodiment.

Turning now to FIG. 21, an illustration of a block diagram of a data processing system is depicted in accordance with an illustrative embodiment. Data processing system 2100 can be used to implement server computer 104, server computer 106, and client devices 110 in FIG. 1. Data processing system 2100 can also be used to implement computer system 216 in FIG. 2. In this illustrative example, data processing system 2100 includes communications framework 2102, which provides communications between processor unit 2104, memory 2106, persistent storage 2108, communications unit 2110, input/output (I/O) unit 2112, and display 2114. In this example, communications framework 2102 takes the form of a bus system.

Processor unit 2104 serves to execute instructions for software that can be loaded into memory 2106. Processor unit 2104 includes one or more processors. For example, processor unit 2104 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2104 can may be implemented using one or more heterogeneous processor systems in which a main processor is present with secondary processors on a single chip. As another illustrative example, processor unit 2104 can be a symmetric multi-processor system containing multiple processors of the same type on a single chip.

Memory 2106 and persistent storage 2108 are examples of storage devices 2116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2116 may also be referred to as computer-readable storage devices in these illustrative examples. Memory 2106, in these examples, can be, for example, a random-access memory or any other suitable volatile or non-volatile storage device. Persistent storage 2108 can take various forms, depending on the particular implementation.

For example, persistent storage 2108 may contain one or more components or devices. For example, persistent storage 2108 can be a hard drive, a solid-state drive (SSD), a flash memory, a rewritable optical disk, a rewritable magnetic tape, or some combination of the above. The media used by persistent storage 2108 also can be removable. For example, a removable hard drive can be used for persistent storage 2108.

Communications unit 2110, in these illustrative examples, provides for communications with other data processing systems or devices. In these illustrative examples, communications unit 2110 is a network interface card.

Input/output unit 2112 allows for input and output of data with other devices that can be connected to data processing system 2100. For example, input/output unit 2112 can provide a connection for user input through at least one of a keyboard, a mouse, or some other suitable input device. Further, input/output unit 2112 can send output to a printer. Display 2114 provides a mechanism to display information to a user.

Instructions for at least one of the operating system, applications, or programs can be located in storage devices 2116, which are in communication with processor unit 2104 through communications framework 2102. The processes of the different embodiments can be performed by processor unit 2104 using computer-implemented instructions, which can be located in a memory, such as memory 2106.

These instructions are referred to as program code, computer usable program code, or computer-readable program code that can be read and executed by a processor in processor unit 2104. The program code in the different embodiments can be embodied on different physical or computer-readable storage media, such as memory 2106 or persistent storage 2108.

Program code 2118 is located in a functional form on computer-readable media 2120 that is selectively removable and can be loaded onto or transferred to data processing system 2100 for execution by processor unit 2104. Program code 2118 and computer-readable media 2120 form computer program product 2122 in these illustrative examples. In the illustrative example, computer-readable media 2120 is computer-readable storage media 2124.

In these illustrative examples, computer-readable storage media 2124 is a physical or tangible storage device used to store program code 2118 rather than a media that propagates or transmits program code 2118. Computer-readable storage media 2124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 2118 can be transferred to data processing system 2100 using a computer-readable signal media. The computer-readable signal media are signals and can be, for example, a propagated data signal containing program code 2118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 2120" can be singular or plural. For example, program code 2118 can be located in computer-readable media 2120 in the form of a single storage device or system. In another example, program code 2118 can be located in computer-readable media 2120 that is distributed in multiple data processing systems. In other words, some instructions in program code 2118 can be located in one data processing system while other instructions in program code 2118 can be located in one data processing system. For example, a portion of program code 2118 can be located in computer-readable media 2120 in a server computer while another portion of program code 2118 can be located in computer-readable media 2120 located in a set of client computers.

The different components illustrated for data processing system 2100 are not meant to provide architectural limitations to the manner in which different embodiments can be implemented. In some illustrative examples, one or more of the components may be incorporated in or otherwise form a portion of, another component. For example, memory 2106, or portions thereof, can be incorporated in processor unit 2104 in some illustrative examples. The different illustrative embodiments can be implemented in a data processing system including components in addition to or in place of those illustrated for data processing system 2100. Other components shown in FIG. 21 can be varied from the illustrative examples shown. The different embodiments can be implemented using any hardware device or system capable of running program code 2118.

Figure 22:
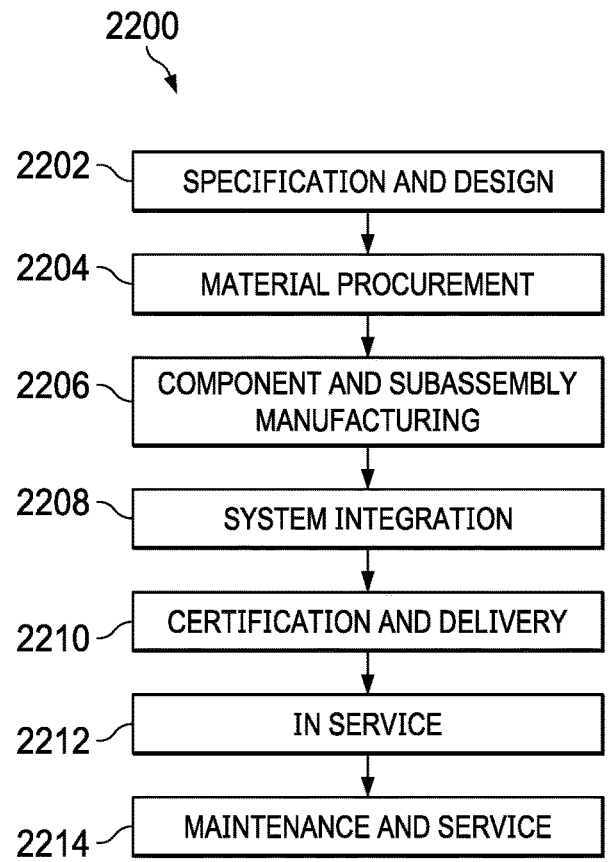
FIG. 22 is an illustration of an aircraft manufacturing and service method in accordance with an illustrative embodiment.
Figure 23:
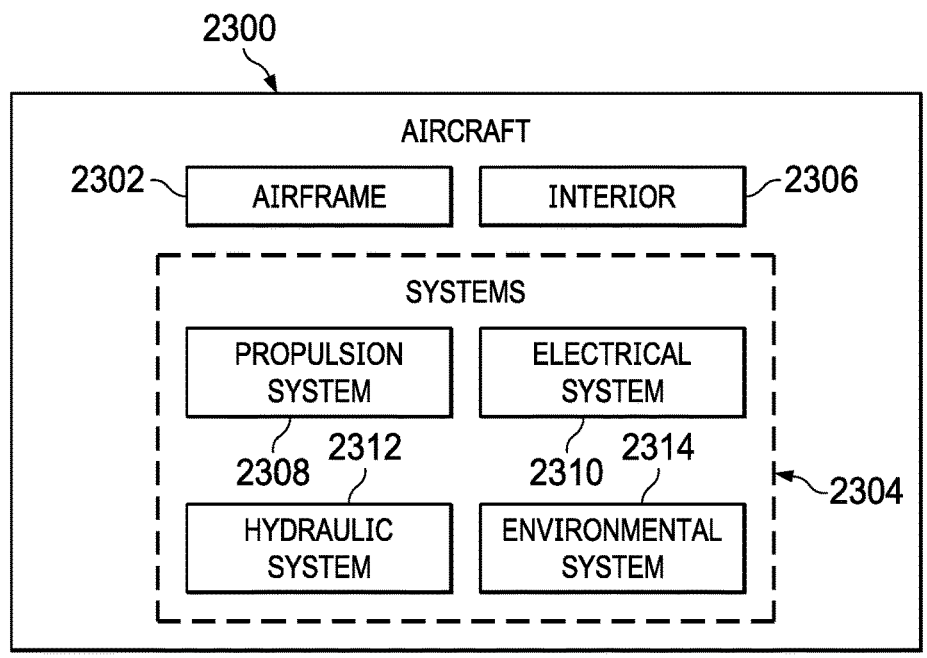
FIG. 23 is an illustration of a block diagram of an aircraft in which an illustrative embodiment may be implemented.

Illustrative embodiments of the disclosure may be described in the context of aircraft manufacturing and service method 2200 as shown in FIG. 22 and aircraft 2300 as shown in FIG. 23. Turning first to FIG. 22, an illustration of an aircraft manufacturing and service method is depicted in accordance with an illustrative embodiment. During preproduction, aircraft manufacturing and service method 2200 may include specification and design 2202 of aircraft 2300 in FIG. 23 and material procurement 2204.

During production, component and subassembly manufacturing 2206 and system integration 2208 of aircraft 2300 in FIG. 23 takes place. Thereafter, aircraft 2300 in FIG. 23 can go through certification and delivery 2210 in order to be placed in service 2212. While in service 2212 by a customer, aircraft 2300 in FIG. 23 is scheduled for routine maintenance and service 2214, which may include modification, reconfiguration, refurbishment, and other maintenance or service.

Each of the processes of aircraft manufacturing and service method 2200 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 23, an illustration of an aircraft is depicted in which an illustrative embodiment may be implemented. In this example, aircraft 2300 is produced by aircraft manufacturing and service method 2200 in FIG. 22 and may include airframe 2302 with plurality of systems 2304 and interior 2306. Examples of systems 2304 include one or more of propulsion system 2308, electrical system 2310, hydraulic system 2312, and environmental system 2314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2200 in FIG. 22.

In one illustrative example, components or subassemblies produced in component and subassembly manufacturing 2206 in FIG. 22 can be fabricated or manufactured in a manner similar to components or subassemblies produced while aircraft 2300 is in service 2212 in FIG. 22. As yet another example, one or more apparatus embodiments, method embodiments, or a combination thereof can be utilized during production stages, such as component and subassembly manufacturing 2206 and system integration 2208 in FIG. 22. One or more apparatus embodiments, method embodiments, or a combination thereof may be utilized while aircraft 2300 is in service 2212, during maintenance and service 2214 in FIG. 22, or both. The use of a number of the different illustrative embodiments may substantially expedite the assembly of aircraft 2300, reduce the cost of aircraft 2300, or both expedite the assembly of aircraft 2300 and reduce the cost of aircraft 2300.

For example, a gesture recognition system can be trained and implemented in aircraft 2300 during at least one of system integration 2208 or maintenance and service 2214. When implemented in aircraft 2300 maintenance and service 2214, this implementation may be part of modification, reconfiguration, refurbishment, and other maintenance or service of aircraft 2300. The gesture recognition system can be used to during in service 2212 for performing ground operations for aircraft 2300.

Thus, the illustrative embodiments provide a method, apparatus, system, and computer program product for gesture recognition. In one illustrative example, a method trains a gesture recognition machine learning model system. Temporal images for a set of gestures used for ground operations for an aircraft are identified by a computer system. Pixel variation data identifying movement on a per image basis from the temporal images is generated by the computer system. The temporal images and the pixel variation data form training data. A set of feature machine learning models is trained by the computer system to recognize features using the training data.

During operation, this gesture recognition system can be used to recognize gestures made by a marshaller during ground operations of an aircraft. The gesture recognition machine learning model system in the gesture recognition system can provide at least one of an improved speed or accuracy in recognizing gestures in real-time to perform ground operations for an aircraft. In the illustrative example, the training data is performed using temporal images of the marshaller making the gestures and using pixel variation data in a manner that improves at least one of speed or accuracy in recognizing the gestures in real-time.

Further, one or more illustrative examples can also use temporal images that include both visible light and infrared images in a manner that increases at least one of speed or accuracy in recognizing gestures by a gesture recognition machine learning model system in at least one of low visibility or low light environments. As a result, one or more illustrative examples can enable recognizing the gestures made by a marshaller to generate commands that can be sent to a controller for an aircraft to control ground operation of the aircraft.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A gesture recognition system, the gesture recognition system comprising:
    a computer system; and
    a machine learning model manager in the computer system, wherein the machine learning model manager is configured to:
        identify temporal color images for a set of gestures used for ground operations for an aircraft;
        generate optical flow data identifying a distribution of visual velocities of a movement of a set of brightness patterns in the temporal color images on a per image basis from the temporal color images;
        generate saliency maps identifying movement in the temporal color images using image segmentation in which a saliency map in the saliency maps is generated on the per image basis, wherein the temporal color images, the optical flow data and the saliency maps form training data;
        train a set of feature machine learning models to recognize features using the training data; and
        train a set of classifier machine learning models to recognize gestures using the features recognized by the set of feature machine learning models trained using the training data, wherein the set of feature machine learning models and the set of classifier machine learning models form a gesture recognition machine learning model system.

2. The gesture recognition system of claim 1, wherein the machine learning model manager is configured to:
    identify the set of gestures from input images from a camera system using the gesture recognition machine learning model system, wherein the input images include a marshaller making the set of gestures for the ground operations.

3. The gesture recognition system of claim 2, wherein the machine learning model manager is configured to:
    determine a set of commands for operating the aircraft using the set of gestures identified by the gesture recognition machine learning model system.

4. The gesture recognition system of claim 3, wherein the machine learning model manager is configured to send the set of commands to a controller for the aircraft, wherein the commands are in a form used by the controller.

5. The gesture recognition system of claim 4, wherein the controller is selected from at least one of a human operator, an autopilot, or an autonomous flight control system.

6. The gesture recognition system of claim 2, wherein the camera system generates color images and thermal images as the input images.

7. The gesture recognition system of claim 3, wherein the set of commands is selected from at least one of stop, emergency stop, turn right, turn left, come ahead, cut engine, start engine, all clear, slow down, flight trim, or hold position.

8. The gesture recognition system of claim 1, wherein in training the set of feature machine learning models to recognize the features using the training data, the machine learning model manager is configured to:
    train an optical flow feature machine learning model in the set of feature machine learning models using the optical flow data;
    train a saliency map feature machine learning model in the set of feature machine learning models using the saliency maps; and
    train a color image feature machine learning model using the temporal color images and features recognized by the optical flow feature machine learning model and the saliency map feature machine learning model.

9. The gesture recognition system of claim 1, wherein in training the set of feature machine learning models to recognize the features using the training data, the machine learning model manager is configured to:
    train an optical flow feature machine learning model in the set of feature machine learning models using the optical flow data;
    train a third feature machine learning model in the set of feature machine learning models using the optical flow data and the saliency maps;
    train a fourth feature machine learning model in the set of feature machine learning models using the saliency maps and the temporal color images; and
    train a color image feature machine learning model in the set of feature machine learning models using the temporal color images and features recognized by the optical flow feature machine learning model, the third feature machine learning model, and the fourth feature machine learning model.

10. The gesture recognition system for claim 1, wherein the set of feature machine learning models is a set of deep neural networks.

11. The gesture recognition system of claim 1, wherein the aircraft is selected from one of an autonomous aerial vehicle, a remote controlled unmanned aerial vehicle, a manned aircraft, a rotorcraft, and a passenger air vehicle.

12. A gesture recognition system comprising:
    a computer system; and
    a machine learning model manager in the computer system, wherein the machine learning model manager is configured to:
        identify temporal images for a set of gestures used for ground operations of an aircraft;
        generate pixel variation data identifying movement in the temporal images on a per image basis, wherein the temporal images and the pixel variation data form training data; and
        train a set of feature machine learning models to recognize features using the training data,
    wherein the pixel variation data comprises optical flow data on the per image basis and a saliency map on the per image basis, and wherein in training the set of feature machine learning models to recognize the features using the training data, the machine learning model manager is configured to:
    train an optical flow feature machine learning model in the set of feature machine learning models using the optical flow data;
    train a saliency map feature machine learning model in the set of feature machine learning models using saliency maps; and
    train a color image feature machine learning model using color images in the temporal images and features recognized by the optical flow feature machine learning model and the saliency map feature machine learning model.

13. The gesture recognition system of claim 12, wherein the machine learning model manager is configured to:
    train a set of classifier machine learning models to recognize gestures using the features recognized by the set of feature machine learning models, wherein the set of feature machine learning models and the set of classifier machine learning models form a gesture recognition machine learning model system.

14. The gesture recognition system of claim 13, wherein the machine learning model manager is configured to:
    receive temporal images of a marshaller from a camera system; and
    identify the set of gestures made by the marshaller using the temporal images of the marshaller and the gesture recognition machine learning model system.

15. The gesture recognition system of claim 14, wherein the machine learning model manager is configured to:
    determine a set of commands using the set of gestures identified by the gesture recognition machine learning model system.

16. The gesture recognition system of claim 15, wherein the machine learning model manager is configured to:
    control a ground operation of the aircraft using the set of commands.

17. The gesture recognition system of claim 16, wherein in controlling the ground operation of the aircraft using the set of commands, the machine learning model manager is configured to:
    send the set of commands to a controller for the aircraft in a form used by the controller to control operation of the aircraft.

18. The gesture recognition system of claim 13, wherein the machine learning model manager is configured to:
    store temporal images of a gesture made by a marshaller in which the temporal images have been processed by the gesture recognition machine learning model system;
    store verification data indicating whether the gesture was correctly identified by the gesture recognition machine learning model system from the temporal images of the gesture made by the marshaller; and
    perform additional training of the gesture recognition machine learning model system using the temporal images of the gesture made by the marshaller and the verification data.

19. The gesture recognition system of claim 12, wherein the temporal images comprise at least one of color images or thermal images.

20. The gesture recognition system of claim 12, wherein the aircraft is selected from one of an autonomous aerial vehicle, a remote controlled unmanned aerial vehicle, a manned aircraft, a rotorcraft, and a passenger air vehicle.

21. A gesture recognition system comprising:
    a computer system; and
    a machine learning model manager in the computer system, wherein the machine learning model manager is configured to:
        identify temporal images for a set of gestures used for ground operations of an aircraft;
        generate pixel variation data identifying movement in the temporal images on a per image basis, wherein the temporal images and the pixel variation data form training data; and
        train a set of feature machine learning models to recognize features using the training data,
    wherein the pixel variation data comprises optical flow data on the per image basis and a saliency map on the per image basis, and wherein in training the set of feature machine learning models to recognize the features using the training data, the machine learning model manager is configured to:
        train an optical flow feature machine learning model in the set of feature machine learning models using the optical flow data;
        train a third feature machine learning model in the set of feature machine learning models using the optical flow data and saliency maps;
        train a fourth feature machine learning model in the set of feature machine learning models using the saliency maps and color images in the temporal images; and
        train a color image feature machine learning model in the set of feature machine learning models using color images in the temporal images and features recognized by the optical flow feature machine learning model, the third feature machine learning model, and the fourth feature machine learning model.

22. The gesture recognition system of claim 21, wherein the pixel variation data comprises the optical flow data on the per image basis and the saliency map on the per image basis, and wherein in training the set of feature machine learning models to recognize the features using the training data, the machine learning model manager is configured to:
    train a saliency map feature machine learning model in the set of feature machine learning models using the saliency maps; and
    train the color image feature machine learning model using color images in the temporal images and features recognized by the optical flow feature machine learning model and the saliency map feature machine learning model.

23. A gesture recognition system comprising:
    a computer system; and
    a machine learning model manager in the computer system, wherein the machine learning model manager is configured to:
        identify temporal images for a set of gestures used for ground operations of an aircraft;
        generate pixel variation data identifying movement in the temporal images on a per image basis, wherein the temporal images and the pixel variation data form training data;
        train a set of feature machine learning models to recognize features using the training data; and
        generate skeleton data from the temporal images on a per frame basis, wherein the skeleton data describes poses of a human operator in the temporal images,
    wherein the training data comprises the temporal images, the pixel variation data, and the skeleton data.

24. The gesture recognition system of claim 23, wherein the pixel variation data comprises optical flow data on the per image basis and a saliency map on the per image basis, and wherein in training the set of feature machine learning models to recognize the features using the training data, the machine learning model manager is configured to:
- train an optical flow feature machine learning model in the set of feature machine learning models using the optical flow data;
- train a saliency map feature machine learning model in the set of feature machine learning models using saliency maps;
- train a color image feature machine learning model using color images in the temporal images and the features recognized by the optical flow feature machine learning model and the saliency map feature machine learning model; and
- train a skeleton feature machine learning model in the set of feature machine learning models using the skeleton data and using features recognized by the optical flow feature machine learning model and the saliency map feature machine learning model.

25. The gesture recognition system of claim 24, wherein the machine learning model manager is configured to:
- train a first classifier machine learning model to recognize gestures using features identified by the color image feature machine learning model; and
- train a second classifier machine learning model to recognize gestures using features identified by the skeleton feature machine learning model.

26. A method for training a gesture recognition machine learning model system, the method comprising:
- identifying, by a computer system, temporal images for a set of gestures used for ground operations for an aircraft;
- generating, by the computer system, pixel variation data identifying movement on a per image basis from the temporal images, wherein the temporal images and the pixel variation data form training data; and
- training, by the computer system, a set of feature machine learning models to recognize features using the training data,
- wherein the pixel variation data comprises optical flow data on the per image basis and saliency maps on the per image basis, and wherein training, by the computer system, the set of feature machine learning models to recognize the features using the training data comprises:
- training an optical flow feature machine learning model in the set of feature machine learning models using the optical flow data;
- training a saliency map feature machine learning model in the set of feature machine learning models using the saliency maps; and
- training a color image feature machine learning model using color images in the temporal images and features recognized by the optical flow feature machine learning model and the saliency map feature machine learning model.

27. The method of claim 26 further comprising:
- training, by the computer system, a set of classifier machine learning models to recognize the set of gestures using the features recognized by the set of feature machine learning models, wherein the set of feature machine learning models and the set of classifier machine learning models form the gesture recognition machine learning model system.

28. The method of claim 27 further comprising:
- receiving temporal images of a marshaller from a camera system; and
- identifying the set of gestures made by the marshaller using the temporal images and the gesture recognition machine learning model system.

29. The method of claim 28 further comprising:
- determining a set of commands using the set of gestures identified by the gesture recognition machine learning model system.

30. The method of claim 29 further comprising:
- controlling a ground operation of the aircraft using the set of commands.

31. The method of claim 30, wherein controlling the ground operation of the aircraft using the set of commands comprises:
- sending the set of commands to a controller for the aircraft in a form used by the controller to control operation of the aircraft.

32. The method of claim 27, further comprising:
- storing temporal images of a gesture made by a marshaller in which the temporal images of the gesture made by the marshaller have been processed by the gesture recognition machine learning model system;
- storing verification data indicating whether the gesture made by the marshaller was correctly identified by the gesture recognition machine learning model system from the temporal images of the gesture made by the marshaller; and
- performing additional training of the gesture recognition machine learning model system using the temporal images of the gesture and the verification data.

33. The method of claim 26 the temporal images comprises at least one of color images or thermal images.

34. The method of claim 26, wherein the aircraft is selected from one of an autonomous aerial vehicle, a remote controlled unmanned aerial vehicle, a manned aircraft, a rotorcraft, and a passenger air vehicle.

35. A method for training a gesture recognition machine learning model system, the method comprising:
- identifying, by a computer system, temporal images for a set of gestures used for ground operations for an aircraft;
- generating, by the computer system, pixel variation data identifying movement on a per image basis from the temporal images, wherein the temporal images and the pixel variation data form training data; and
- training, by the computer system, a set of feature machine learning models to recognize features using the training data,
- wherein the pixel variation data comprises optical flow data on the per image basis and a saliency map on the per image basis, and wherein training, by the computer system, the set of feature machine learning models to recognize the features using the training data comprises:
- training an optical flow feature machine learning model in the set of feature machine learning models using the optical flow data;
- training a third feature machine learning model in the set of feature machine learning models using the optical flow data and saliency maps;
- training a fourth feature machine learning model in the set of feature machine learning models using the saliency maps and color images in the temporal images; and
- training a color image feature machine learning model in the set of feature machine learning models using the color images in the temporal images and features recognized by the optical flow feature machine learning model, the third feature machine learning model, and the fourth feature machine learning model.

36. The method of claim 35, wherein the pixel variation data comprises the optical flow data on the per image basis and the saliency maps on the per image basis, and wherein training, by the computer system, the set of feature machine learning models to recognize the features using the training data comprises:
  training a saliency map feature machine learning model in the set of feature machine learning models using the saliency maps; and
  training the color image feature machine learning model using color images in the temporal images and features recognized by the optical flow feature machine learning model and the saliency map feature machine learning model.

37. A method for training a gesture recognition machine learning model system, the method comprising:
  identifying, by a computer system, temporal images for a set of gestures used for ground operations for an aircraft;
  generating, by the computer system, pixel variation data identifying movement on a per image basis from the temporal images, wherein the temporal images and the pixel variation data form training data;
  training, by the computer system, a set of feature machine learning models to recognize features using the training data; and
  generating, by the computer system, skeleton data from the temporal images on a per frame basis, wherein the skeleton data describes poses of a human operator in the temporal images,
  wherein the training data comprises the temporal images, the pixel variation data, and the skeleton data.

38. The method of claim 37, wherein the pixel variation data comprises optical flow data on the per image basis and a saliency map on the per image basis, and wherein training, by the computer system, the set of feature machine learning models to recognize the features using the training data comprises:
  training an optical flow feature machine learning model in the set of feature machine learning models using the optical flow data;
  training a saliency map feature machine learning model in the set of feature machine learning models using saliency maps;
  training a color image feature machine learning model using color images in the temporal images and the features recognized by the optical flow feature machine learning model and the saliency map feature machine learning model; and
  training a skeleton feature machine learning model in the set of feature machine learning models using the skeleton data and features recognized by the optical flow feature machine learning model and the saliency map feature machine learning model.

39. The method of claim 38 further comprising:
  training, by the computer system, a first classifier machine learning model to recognize gestures using features identified by the color image feature machine learning model; and
  training, by the computer system, a second classifier machine learning model to recognize gestures using features identified by the skeleton feature machine learning model.

40. A computer program product for a gesture recognition machine learning model system, the computer program product comprising:
  a computer-readable storage media;
  first program code, stored on the computer-readable storage media, executable by a computer system to cause the computer system to identify temporal images for a set of gestures used for ground operations for an aircraft;
  second program code, stored on the computer-readable storage media, executable by the computer system to cause the computer system to generate pixel variation data identifying movement on a per image basis from the temporal images, wherein the temporal images and the pixel variation data form training data; and
  third program code, stored on the computer-readable storage media, executable by the computer system to cause the computer system to train a set of feature machine learning models to recognize features using the training data,
  wherein the pixel variation data comprises optical flow data on a per image basis and a saliency map on the per image basis, and wherein the third program code causes the computer system to:
  train an optical flow feature machine learning model in the set of feature machine learning models using the optical flow data;
  train a saliency map feature machine learning model in the set of feature machine learning models using saliency maps; and
  train a color image feature machine learning model using color images in the temporal images and features recognized by the optical flow feature machine learning model and the saliency map feature machine learning model.

\* \* \* \* \*